（12）United States Patent
Chen et al.

(10) Patent No.: US 10,001,626 B2
(45) Date of Patent: Jun. 19, 2018

(54) OPTICAL IMAGING LENS

(71) Applicant: Genius Electronic Optical Co., Ltd., Taichung (TW)

(72) Inventors: Ching-Hung Chen, Taichung (TW); Pei-Chi Wang, Taichung (TW)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 128 days.

(21) Appl. No.: 15/047,637

(22) Filed: Feb. 19, 2016

(65) Prior Publication Data

US 2017/0192206 A1    Jul. 6, 2017

(30) Foreign Application Priority Data

Jan. 6, 2016   (CN) .......................... 2016 1 0007785

(51) Int. Cl.
| | |
|---|---|
| *G02B 13/18* | (2006.01) |
| *G02B 13/00* | (2006.01) |
| *G02B 9/60* | (2006.01) |
| *G02B 27/00* | (2006.01) |
| *G02B 5/20* | (2006.01) |

(52) U.S. Cl.
CPC ........... *G02B 13/0045* (2013.01); *G02B 9/60* (2013.01); *G02B 27/0025* (2013.01); *G02B 5/208* (2013.01)

(58) Field of Classification Search
CPC .... G02B 13/001; G02B 13/0045; G02B 9/60; G02B 3/04

USPC .................................................. 359/708, 714
See application file for complete search history.

(56) References Cited

U.S. PATENT DOCUMENTS

| | | | |
|---|---|---|---|
| 8,179,615 B1 | 5/2012 | Tang et al. | |
| 8,531,784 B2 | 9/2013 | Hashimoto | |
| 9,116,328 B2* | 8/2015 | Chang | ...................... G02B 9/60 |
| 9,134,510 B2 | 9/2015 | Suzuki | |
| 2013/0050847 A1* | 2/2013 | Hsu | .................... G02B 13/0045 |
| | | | 359/714 |
| 2015/0253539 A1 | 9/2015 | Ye et al. | |

* cited by examiner

*Primary Examiner* — Robert E Tallman
(74) *Attorney, Agent, or Firm* — JCIPRNET

(57) ABSTRACT

An optical imaging lens includes first, second, third, fourth, and fifth lens elements arranged in sequence from an object side to an image side along an optical axis. Each lens element has an object-side surface and an image-side surface. The image-side surface of the first lens element has a convex portion in an optical axis region. The second lens element has negative refractive power. The object-side surface of the second lens element has a convex portion in an optical axis region. The third lens element has positive refractive power. The image-side surface of the third lens element has a concave portion in an optical axis region. The object-side surface of the fourth lens element has a concave portion in an optical axis region. The object-side surface of the fifth lens element has a convex portion in an optical axis region.

20 Claims, 27 Drawing Sheets

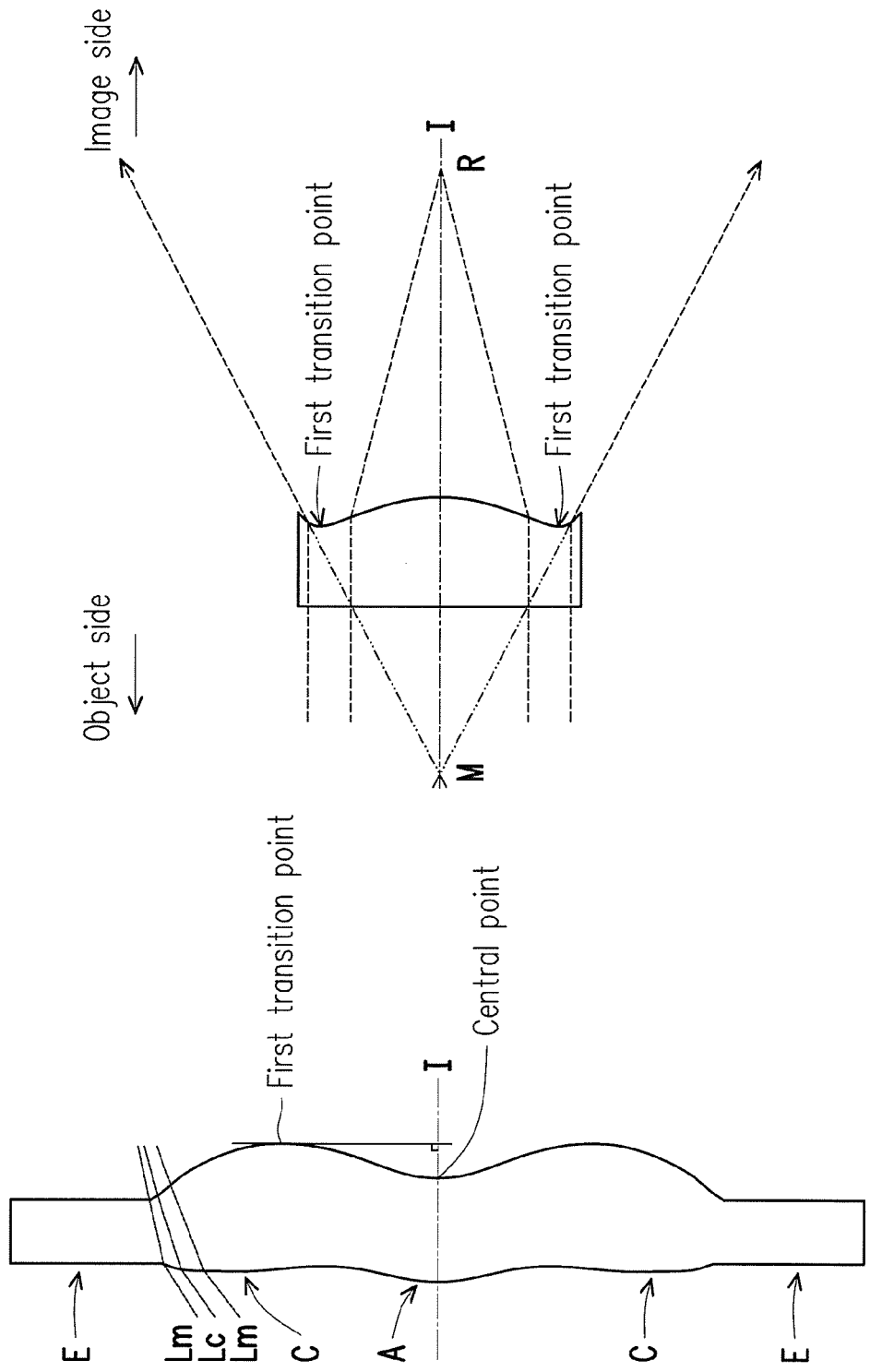

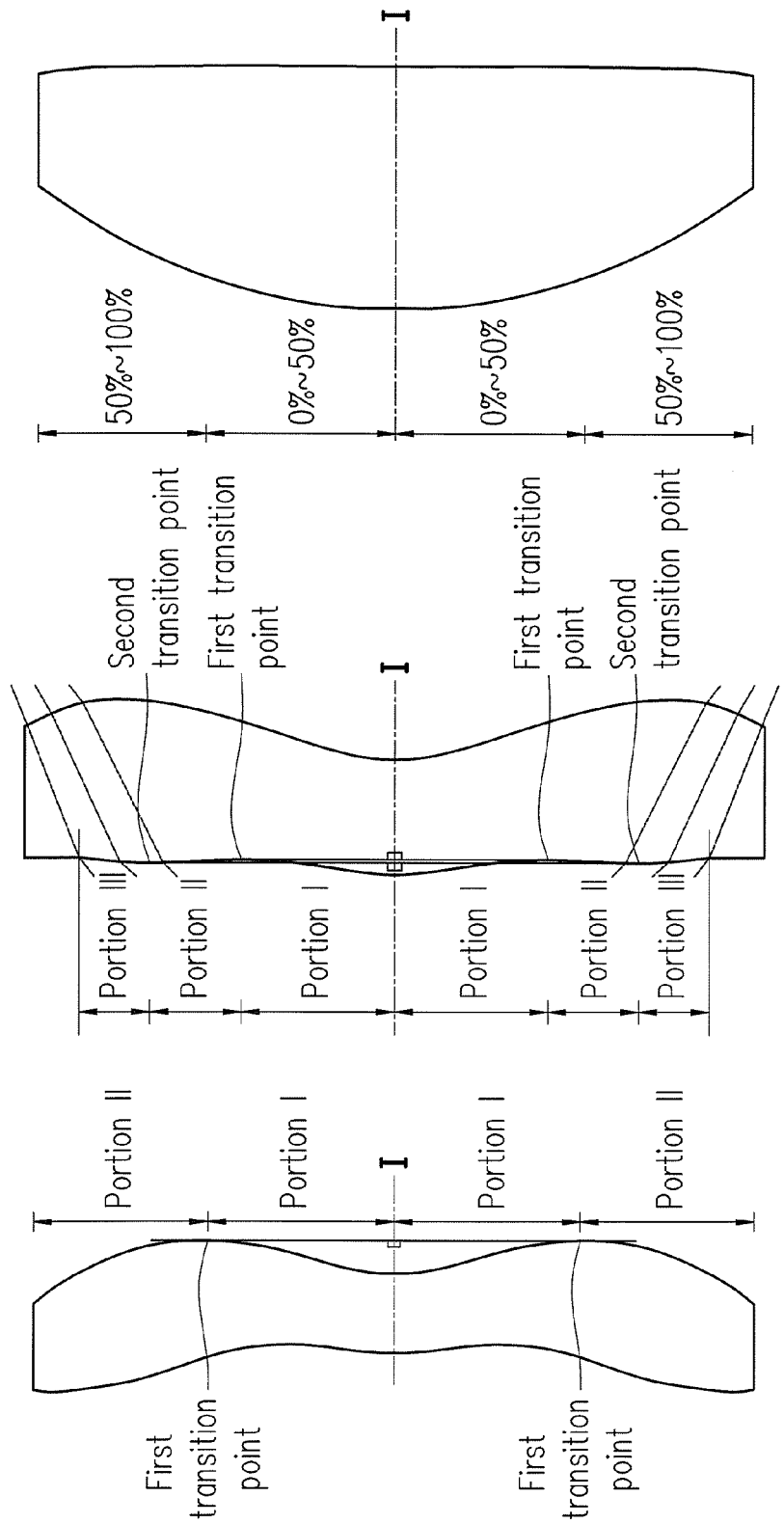

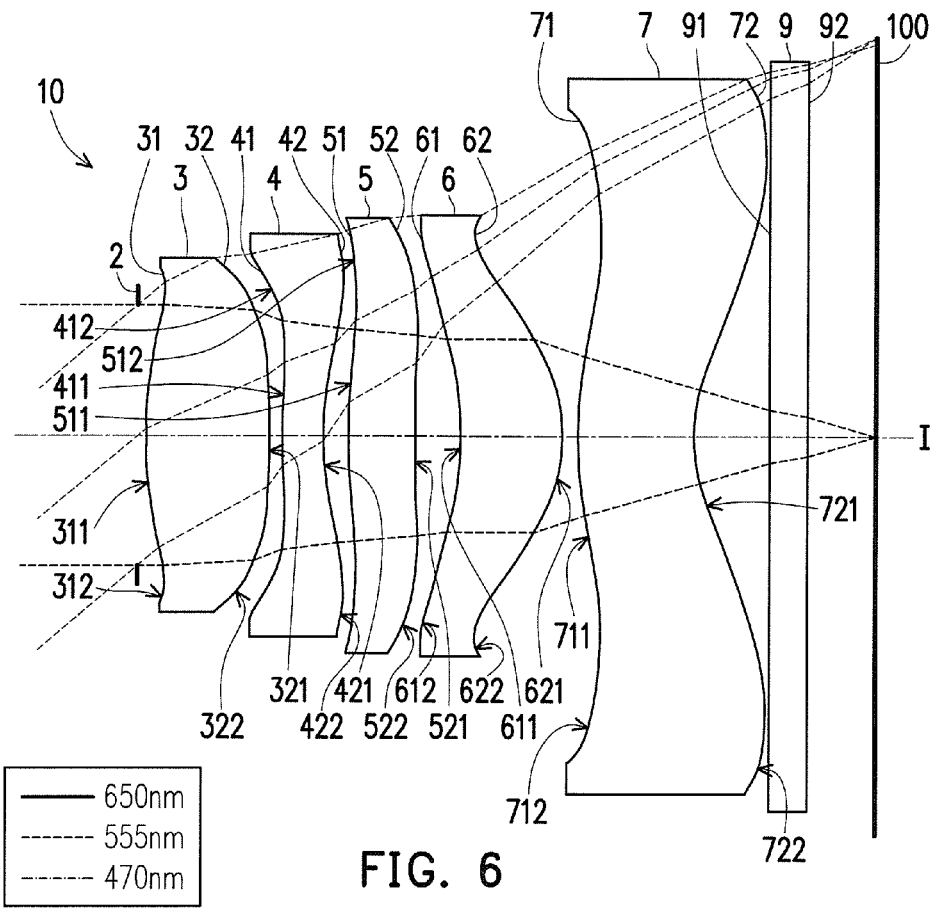
FIG. 6
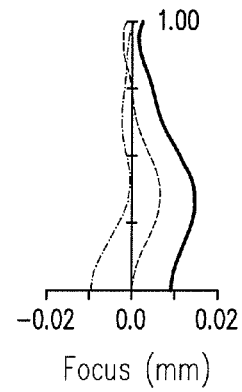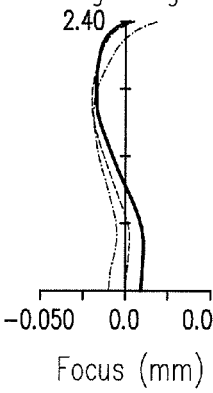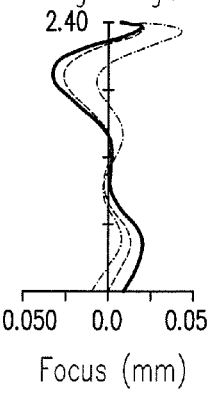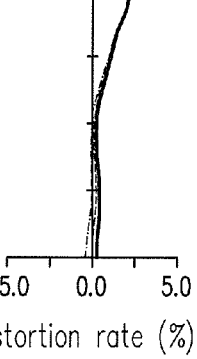
FIG. 7A    FIG. 7B    FIG. 7C    FIG. 7D

| First embodiment |||||||
|---|---|---|---|---|---|---|
| Effective focal length =2.835 mm , Half field of view=39.7415°, f-number=1.8, System length =4.429 mm, Image height=2.4 mm |||||||
| Lens element | Surface | Radius of curvature(mm) | Thickness (mm) | Refractive index | Dispersion coefficient | Focal length(mm) |
| Object | | | 1E+13 | | | |
| Aperture stop 2 | | | 0.041407 | | | |
| First lens element 3 | Object-side surface 31 | 2.525758 | 0.749651 | 1.545931 | 56.11379 | 3.57464 |
| | Image-side surface 32 | -7.68376 | 0.077954 | | | |
| Second lens element 4 | Object-side surface 41 | 3.604194 | 0.254068 | 1.644569 | 23.51792 | -4.999035 |
| | Image-side surface 42 | 1.654258 | 0.151765 | | | |
| Third lens element 5 | Object-side surface 51 | 3.216718 | 0.403176 | 1.545931 | 56.11379 | 8.535699 |
| | Image-side surface 52 | 9.926742 | 0.282435 | | | |
| Fourth lens element 6 | Object-side surface 61 | -1.728332 | 0.616413 | 1.545931 | 56.11379 | 2.912844 |
| | Image-side surface 62 | -0.932509 | 0.091867 | | | |
| Fifth lens element 7 | Object-side surface 71 | 1.868673 | 0.707788 | 1.532854 | 55.90431 | -4.176773 |
| | Image-side surface 72 | 0.882045 | 0.463053 | | | |
| Filter 9 | Object-side surface 91 | | 0.231525 | 1.518274 | 64.16641 | |
| | Image-side surface 92 | ∞ | 0.39978 | | | |
| | Image plane 100 | ∞ | 0.001113 | | | |

FIG. 8

| Surface | K | a4 | a6 | a8 | a10 |
|---|---|---|---|---|---|
| 31 | 4.775955E+00 | -6.432496E-02 | 1.966143E-02 | -2.439437E-01 | 3.331396E-01 |
| 32 | 0.000000E+00 | -1.942748E-01 | 9.906236E-02 | -1.751148E-01 | 1.329018E-01 |
| 41 | 0.000000E+00 | -3.623550E-01 | 2.448044E-01 | -3.462773E-01 | 1.945977E-01 |
| 42 | 5.158124E-01 | -3.334986E-01 | 2.774476E-01 | -3.112075E-01 | 1.461515E-01 |
| 51 | 0.000000E+00 | -1.725020E-01 | 6.404413E-02 | -1.274451E-02 | 0.000000E+00 |
| 52 | 0.000000E+00 | -5.352624E-02 | -1.878400E-02 | 0.000000E+00 | 0.000000E+00 |
| 61 | 0.000000E+00 | 1.960416E-01 | -2.785250E-01 | 4.811946E-01 | -4.375234E-01 |
| 62 | -5.896802E-01 | 1.790228E-01 | -1.095141E-01 | 1.444735E-01 | -5.719996E-02 |
| 71 | -2.771513E+00 | -1.894756E-01 | 1.262234E-01 | -5.354789E-02 | 6.925154E-03 |
| 72 | -3.919542E+00 | -9.634053E-02 | 6.020886E-02 | -2.698148E-02 | 7.548391E-03 |
| Surface | a12 | a14 | a16 | a18 | a20 |
| 31 | -2.497462E-01 | 0.000000E+00 | 0.000000E+00 | 0.000000E+00 | 0.000000E+00 |
| 32 | -5.678197E-02 | 0.000000E+00 | 0.000000E+00 | 0.000000E+00 | 0.000000E+00 |
| 41 | -9.311242E-03 | 0.000000E+00 | 0.000000E+00 | 0.000000E+00 | 0.000000E+00 |
| 42 | -2.435320E-02 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 1.922074E-01 | -3.153908E-02 | 0.000000E+00 | 0.000000E+00 | 0.000000E+00 |
| 62 | 1.557907E-02 | 1.559906E-05 | 0.000000E+00 | 0.000000E+00 | 0.000000E+00 |
| 71 | 2.782815E-03 | -1.009920E-03 | 9.036326E-05 | -3.522291E-07 | -6.822327E-09 |
| 72 | -1.371105E-03 | 1.537192E-04 | -8.302584E-06 | 2.776022E-08 | -4.620457E-09 |

FIG. 9

| Second embodiment ||||||
|---|---|---|---|---|---|
| Effective focal length =2.970 mm , Half field of view=38.727°, F-number=1.8, System length =4.639 mm, Image height=2.4 mm ||||||
| Lens element | Surface | Radius of curvature(mm) | Thickness (mm) | Refractive index | Dispersion coefficient | Focal length(mm) |
| Object | | | 1E+13 | | | |
| Aperture stop 2 | | | -0.009873 | | | |
| First lens element 3 | Object-side surface 31 | 2.740124 | 0.879281 | 1.545931 | 56.11379 | 3.383193 |
| | Image-side surface 32 | -5.02441 | 0.060814 | | | |
| Second lens element 4 | Object-side surface 41 | 5.1482 | 0.27091 | 1.644569 | 23.51792 | -4.342406 |
| | Image-side surface 42 | 1.775789 | 0.102966 | | | |
| Third lens element 5 | Object-side surface 51 | 4.094949 | 0.599178 | 1.545931 | 56.11379 | 8.083951 |
| | Image-side surface 52 | 53.83805 | 0.085659 | | | |
| Fourth lens element 6 | Object-side surface 61 | -2.453646 | 0.617879 | 1.545931 | 56.11379 | 3.009667 |
| | Image-side surface 62 | -1.071597 | 0.183075 | | | |
| Fifth lens element 7 | Object-side surface 71 | 2.70187 | 0.783933 | 1.532854 | 55.90431 | -3.496923 |
| | Image-side surface 72 | 0.991572 | 0.506922 | | | |
| Filter 9 | Object-side surface 91 | 1E+18 | 0.231525 | 1.518274 | 64.16641 | |
| | Image-side surface 92 | | 0.317586 | | | |
| | Image plane 100 | | 0.02188 | | | |

FIG. 12

| Surface | K | a4 | a6 | a8 | a10 |
|---|---|---|---|---|---|
| 31 | 5.307230E+00 | -1.557885E-01 | 1.519722E+00 | -1.202023E+01 | 5.433419E+01 |
| 32 | 0.000000E+00 | -2.169178E-01 | 3.078832E-01 | -1.036169E+00 | 2.342920E+00 |
| 41 | 0.000000E+00 | -3.753539E-01 | 5.393054E-01 | -2.167954E+00 | 5.462017E+00 |
| 42 | 5.282934E-01 | -3.139052E-01 | 4.338678E-01 | -1.195921E+00 | 2.257450E+00 |
| 51 | 0.000000E+00 | -1.907863E-01 | 2.011940E-01 | -2.538332E-01 | 2.978309E-01 |
| 52 | 0.000000E+00 | -2.380171E-02 | -8.277089E-02 | -3.997879E-02 | 3.384861E-01 |
| 61 | 0.000000E+00 | 2.282796E-01 | -2.711792E-01 | 3.449016E-01 | -1.604473E-01 |
| 62 | -5.478423E-01 | 1.516225E-01 | -1.521707E-01 | 5.770775E-01 | -1.124381E+00 |
| 71 | -2.771513E+00 | -2.187528E-01 | 1.167475E-01 | -5.334632E-02 | 7.455424E-03 |
| 72 | -3.919542E+00 | -9.599622E-02 | 5.782754E-02 | -2.588854E-02 | 7.579234E-03 |
| Surface | a12 | a14 | a16 | a18 | a20 |
| 31 | -1.524848E+02 | 2.686409E+02 | -2.895126E+02 | 1.744649E+02 | -4.508251E+01 |
| 32 | -3.610033E+00 | 3.778862E+00 | -2.684644E+00 | 1.189713E+00 | -2.478783E-01 |
| 41 | -9.214786E+00 | 1.027755E+01 | -7.263026E+00 | 2.971964E+00 | -5.343297E-01 |
| 42 | -3.068967E+00 | 2.812098E+00 | -1.612660E+00 | 5.213432E-01 | -7.217419E-02 |
| 51 | -3.185178E-01 | 2.956221E-01 | -1.957102E-01 | 7.468292E-02 | -1.186422E-02 |
| 52 | -5.464038E-01 | 4.455936E-01 | -2.045079E-01 | 5.049130E-02 | -5.237212E-03 |
| 61 | -8.322560E-02 | 1.229161E-01 | -4.983985E-02 | 7.386823E-03 | -1.378199E-04 |
| 62 | 1.464225E+00 | -1.133423E+00 | 4.915092E-01 | -1.057798E-01 | 7.934092E-03 |
| 71 | 3.086290E-03 | -9.056342E-04 | 1.104469E-04 | -1.735544E-06 | -3.346538E-06 |
| 72 | -1.403499E-03 | 1.507898E-04 | -8.006114E-06 | 1.277080E-07 | -7.063360E-09 |

FIG. 13

| Third embodiment | | | | | | |
|---|---|---|---|---|---|---|
| Effective focal length = 2.866 mm , Half field of view= 39.466°, f-number=1.8, System length = 4.375 mm, Image height=2.4 mm | | | | | | |
| Lens element | Surface | Radius of curvature(mm) | Thickness (mm) | Refractive index | Dispersion coefficient | Focal length(mm) |
| Object | | | 1E+13 | | | |
| Aperture stop 2 | | 1.00E+18 | 0.034248 | | | |
| First lens element 3 | Object-side surface 31 | 2.472937 | 0.712387 | 1.545931 | 56.11379 | 3.866156 |
| | Image-side surface 32 | -12.94168 | 0.105853 | | | |
| Second lens element 4 | Object-side surface 41 | 3.0231 | 0.268098 | 1.644569 | 23.51792 | -5.876014 |
| | Image-side surface 42 | 1.622765 | 0.205072 | | | |
| Third lens element 5 | Object-side surface 51 | 3.022197 | 0.400093 | 1.545931 | 56.11379 | 11.00442 |
| | Image-side surface 52 | 5.797268 | 0.291636 | | | |
| Fourth lens element 6 | Object-side surface 61 | -1.852617 | 0.542866 | 1.545931 | 56.11379 | 2.743224 |
| | Image-side surface 62 | -0.913849 | 0.13155 | | | |
| Fifth lens element 7 | Object-side surface 71 | 1.697333 | 0.613105 | 1.532854 | 55.90431 | -4.050101 |
| | Image-side surface 72 | 0.830794 | 0.463054 | | | |
| Filter 9 | Object-side surface 91 | 1.00E+18 | 0.231525 | 1.518274 | 64.16641 | |
| | Image-side surface 92 | | 0.410604 | | | |
| | Image plane 100 | | -0.005445 | | | |

FIG. 16

| Surface | K | a4 | a6 | a8 | a10 |
|---|---|---|---|---|---|
| 31 | 4.665189E+00 | -6.853305E-02 | 2.785684E-02 | -2.648046E-01 | 3.511220E-01 |
| 32 | 0.000000E+00 | -2.025885E-01 | 1.536838E-01 | -2.456551E-01 | 1.706690E-01 |
| 41 | 0.000000E+00 | -3.745690E-01 | 2.894921E-01 | -3.607572E-01 | 1.861700E-01 |
| 42 | 0.000000E+00 | -3.745690E-01 | 2.894921E-01 | -3.607572E-01 | 1.861700E-01 |
| 51 | 0.000000E+00 | -1.565321E-01 | 4.148758E-02 | -3.948080E-03 | 0.000000E+00 |
| 52 | 0.000000E+00 | -5.138212E-02 | -1.927685E-02 | 0.000000E+00 | 0.000000E+00 |
| 61 | 0.000000E+00 | 1.936130E-01 | -2.849804E-01 | 4.500287E-01 | -3.979384E-01 |
| 62 | -5.892175E-01 | 2.149345E-01 | -1.606079E-01 | 1.896903E-01 | -8.911946E-02 |
| 71 | -2.771513E+00 | -1.925629E-01 | 1.286884E-01 | -5.412205E-02 | 6.853329E-03 |
| 72 | -3.919542E+00 | -9.416404E-02 | 5.966422E-02 | -2.748056E-02 | 7.638520E-03 |
| Surface | a12 | a14 | a16 | a18 | a20 |
| 31 | -2.498115E-01 | 0.000000E+00 | 0.000000E+00 | 0.000000E+00 | 0.000000E+00 |
| 32 | -6.178473E-02 | 0.000000E+00 | 0.000000E+00 | 0.000000E+00 | 0.000000E+00 |
| 41 | -9.343949E-03 | 0.000000E+00 | 0.000000E+00 | 0.000000E+00 | 0.000000E+00 |
| 42 | -9.343949E-03 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 1.754175E-01 | -2.937873E-02 | 0.000000E+00 | 0.000000E+00 | 0.000000E+00 |
| 62 | 3.043061E-02 | -1.942330E-03 | 0.000000E+00 | 0.000000E+00 | 0.000000E+00 |
| 71 | 2.793059E-03 | -1.003159E-03 | 9.220609E-05 | -1.043996E-07 | -6.701736E-08 |
| 72 | -1.365211E-03 | 1.533246E-04 | -8.445945E-06 | 1.664655E-08 | -1.686041E-10 |

FIG. 17

| Fourth embodiment ||||||
|---|---|---|---|---|---|
| Effective focal length = 3.12 mm , Half field of view= 38°, f-number=1.8, System length = 4.750 mm, Image height=2.4 mm ||||||
| Lens element | Surface | Radius of curvature(mm) | Thickness (mm) | Refractive index | Dispersion coefficient | Focal length(mm) |
| Object | | | 1E+13 | | | |
| Aperture stop 2 | | | -0.058797 | | | |
| First lens element 3 | Object-side surface 31 | 2.595151 | 0.890537 | 1.545931 | 56.11379 | 3.791554 |
| | Image-side surface 32 | -8.988194 | 0.06 | | | |
| Second lens element 4 | Object-side surface 41 | 3.521956 | 0.22 | 1.644569 | 23.51792 | -4.995621 |
| | Image-side surface 42 | 1.640932 | 0.128 | | | |
| Third lens element 5 | Object-side surface 51 | 3.265808 | 0.610903 | 1.545931 | 56.11379 | 8.782482 |
| | Image-side surface 52 | 9.565521 | 0.318255 | | | |
| Fourth lens element 6 | Object-side surface 61 | -1.86842 | 0.558357 | 1.545931 | 56.11379 | 2.848006 |
| | Image-side surface 62 | -0.938184 | 0.06 | | | |
| Fifth lens element 7 | Object-side surface 71 | 1.955292 | 0.688319 | 1.532854 | 55.90431 | -3.711968 |
| | Image-side surface 72 | 0.862949 | 0.541644 | | | |
| Filter 9 | Object-side surface 91 | 1.00E+18 | 0.231525 | 1.518274 | 64.16641 | |
| | Image-side surface 92 | | 0.443179 | | | |
| | Image plane 100 | | -0.007796 | | | |

FIG. 20

| Surface | K | a4 | a6 | a8 | a10 |
|---|---|---|---|---|---|
| 31 | 4.869570E+00 | -9.070080E-02 | 4.460519E-01 | -3.361606E+00 | 1.365377E+01 |
| 32 | 0.000000E+00 | -1.875247E-01 | 1.939734E-01 | -8.255074E-01 | 2.438668E+00 |
| 41 | 0.000000E+00 | -3.421269E-01 | 4.987169E-01 | -1.764615E+00 | 4.612035E+00 |
| 42 | 4.978932E-01 | -3.671449E-01 | 6.340020E-01 | -1.791684E+00 | 3.744810E+00 |
| 51 | 0.000000E+00 | -1.992190E-01 | 2.428784E-01 | -5.561748E-01 | 1.011848E+00 |
| 52 | 0.000000E+00 | -2.255679E-02 | -1.204288E-01 | 3.777789E-01 | -6.827380E-01 |
| 61 | 0.000000E+00 | 2.000393E-01 | -3.975754E-01 | 6.631189E-01 | -3.546681E-01 |
| 62 | -5.794617E-01 | 1.688171E-01 | 5.140314E-02 | -4.586369E-01 | 1.135307E+00 |
| 71 | -2.771513E+00 | -1.915018E-01 | 1.291226E-01 | -5.371126E-02 | 6.894169E-03 |
| 72 | -3.919542E+00 | -8.852712E-02 | 5.733278E-02 | -2.596187E-02 | 7.500000E-03 |
| Surface | a12 | a14 | a16 | a18 | a20 |
| 31 | -3.453519E+01 | 5.456906E+01 | -5.253955E+01 | 2.816828E+01 | -6.461385E+00 |
| 32 | -4.695932E+00 | 5.744470E+00 | -4.300375E+00 | 1.787413E+00 | -3.148763E-01 |
| 41 | -8.200400E+00 | 9.418489E+00 | -6.633749E+00 | 2.599958E+00 | -4.301025E-01 |
| 42 | -5.551276E+00 | 5.435141E+00 | -3.312431E+00 | 1.135665E+00 | -1.662942E-01 |
| 51 | -1.439295E+00 | 1.538610E+00 | -1.076946E+00 | 4.249247E-01 | -7.064688E-02 |
| 52 | 7.181805E-01 | -4.686702E-01 | 1.870090E-01 | -4.240864E-02 | 4.220832E-03 |
| 61 | -3.754653E-01 | 7.433629E-01 | -5.260002E-01 | 1.801127E-01 | -2.477669E-02 |
| 62 | -1.409616E+00 | 1.072340E+00 | -4.982151E-01 | 1.290725E-01 | -1.407347E-02 |
| 71 | 2.788615E-03 | -1.007755E-03 | 9.070908E-05 | -2.460943E-07 | 6.747718E-08 |
| 72 | -1.396368E-03 | 1.529273E-04 | -7.716935E-06 | 1.326899E-07 | -1.784551E-08 |

FIG. 21

| Fifth embodiment | | | | | | |
|---|---|---|---|---|---|---|
| Effective focal length = 2.938 mm , Half field of view= 38.775°, f-number=1.8, System length = 4.422 mm, Image height=2.4 mm | | | | | | |
| Lens element | Surface | Radius of curvature(mm) | Thickness (mm) | Refractive index | Dispersion coefficient | Focal length(mm) |
| Object | | | 1E+13 | | | |
| Aperture stop 2 | | 1E+18 | 0.03137 | | | |
| First lens element 3 | Object-side surface 31 | 2.453045 | 0.767923 | 1.545931 | 56.11379 | 3.580609 |
| | Image-side surface 32 | -8.559507 | 0.061849 | | | |
| Second lens element 4 | Object-side surface 41 | 3.420078 | 0.22 | 1.644569 | 23.51792 | -4.95264 |
| | Image-side surface 42 | 1.60951 | 0.150472 | | | |
| Third lens element 5 | Object-side surface 51 | 2.430358 | 0.303603 | 1.545931 | 56.11379 | 10.21692 |
| | Image-side surface 52 | 4.11704 | 0.489436 | | | |
| Fourth lens element 6 | Object-side surface 61 | -1.815522 | 0.434534 | 1.545931 | 56.11379 | 2.910065 |
| | Image-side surface 62 | -0.918889 | 0.065903 | | | |
| Fifth lens element 7 | Object-side surface 71 | 1.874949 | 0.671253 | 1.532854 | 55.90431 | -4.193854 |
| | Image-side surface 72 | 0.892657 | 0.465251 | | | |
| Filter 9 | Object-side surface 91 | 1E+18 | 0.231525 | 1.518274 | 64.16641 | |
| | Image-side surface 92 | | 0.460793 | | | |
| | Image plane 100 | | -0.006233 | | | |

FIG. 24

| Surface | K | a4 | a6 | a8 | a10 |
|---|---|---|---|---|---|
| 31 | 4.775932E+00 | -7.042759E-02 | 3.578268E-02 | -3.213884E-01 | 4.558693E-01 |
| 32 | 0.000000E+00 | -1.902720E-01 | 7.296094E-02 | -1.254555E-01 | 9.707072E-02 |
| 41 | 0.000000E+00 | -3.529321E-01 | 2.182558E-01 | -2.885241E-01 | 1.800648E-01 |
| 42 | 5.109279E-01 | -3.450693E-01 | 2.895217E-01 | -3.211699E-01 | 1.554312E-01 |
| 51 | 0.000000E+00 | -1.783813E-01 | 7.958381E-02 | -2.765891E-02 | 0.000000E+00 |
| 52 | 0.000000E+00 | -5.999838E-02 | -1.619032E-02 | 0.000000E+00 | 0.000000E+00 |
| 61 | 0.000000E+00 | 1.665848E-01 | -1.667139E-01 | 1.879336E-01 | -8.492919E-02 |
| 62 | -5.809509E-01 | 1.869333E-01 | -7.182182E-02 | 5.035203E-02 | 5.087114E-02 |
| 71 | -2.771513E+00 | -2.100671E-01 | 1.322974E-01 | -5.355175E-02 | 6.853888E-03 |
| 72 | -3.919542E+00 | -1.098875E-01 | 6.532156E-02 | -2.835528E-02 | 7.632965E-03 |
| Surface | a12 | a14 | a16 | a18 | a20 |
| 31 | -3.227642E-01 | 0.000000E+00 | 0.000000E+00 | 0.000000E+00 | 0.000000E+00 |
| 32 | -4.460749E-02 | 0.000000E+00 | 0.000000E+00 | 0.000000E+00 | 0.000000E+00 |
| 41 | -2.317063E-02 | 0.000000E+00 | 0.000000E+00 | 0.000000E+00 | 0.000000E+00 |
| 42 | -3.410021E-02 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | -2.203473E-03 | 7.757957E-03 | 0.000000E+00 | 0.000000E+00 | 0.000000E+00 |
| 62 | -3.443105E-02 | 8.545652E-03 | 0.000000E+00 | 0.000000E+00 | 0.000000E+00 |
| 71 | 2.778095E-03 | -1.007869E-03 | 9.101216E-05 | -3.743587E-07 | -1.161775E-07 |
| 72 | -1.360222E-03 | 1.537098E-04 | -8.471567E-06 | 2.237324E-09 | -3.019182E-09 |

FIG. 25

| Sixth embodiment |||||||
|---|---|---|---|---|---|---|
| Effective focal length = 3.087 mm , Half field of view= 38°, f-number=1.8, System length = 4.693 mm, Image height=2.4 mm |||||||
| Lens element | Surface | Radius of curvature(mm) | Thickness (mm) | Refractive index | Dispersion coefficient | Focal length(mm) |
| Object | | | 1E+13 | | | |
| Aperture stop 2 | | 1E+18 | -0.094109 | | | |
| First lens element 3 | Object-side surface 31 | 2.509389 | 1.065345 | 1.545931 | 56.11379 | 3.471383 |
| | Image-side surface 32 | -6.581407 | 0.061002 | | | |
| Second lens element 4 | Object-side surface 41 | 3.963293 | 0.239471 | 1.644569 | 23.51792 | -4.621964 |
| | Image-side surface 42 | 1.660465 | 0.171216 | | | |
| Third lens element 5 | Object-side surface 51 | 2.790636 | 0.395969 | 1.545931 | 56.11379 | 9.992006 |
| | Image-side surface 52 | 5.427292 | 0.244249 | | | |
| Fourth lens element 6 | Object-side surface 61 | -1.813423 | 0.589707 | 1.545931 | 56.11379 | 2.835937 |
| | Image-side surface 62 | -0.931093 | 0.136337 | | | |
| Fifth lens element 7 | Object-side surface 71 | 1.834235 | 0.607246 | 1.532854 | 55.90431 | -3.850153 |
| | Image-side surface 72 | 0.856963 | 0.508762 | | | |
| Filter 9 | Object-sideSurface 91 | 1E+18 | 0.231525 | 1.518274 | 64.16641 | |
| | Image-side surface 92 | | 0.443076 | | | |
| | Image plane 100 | | -0.006442 | | | |

FIG. 28

| Surface | K | a4 | a6 | a8 | a10 |
|---|---|---|---|---|---|
| 31 | 4.984302E+00 | -7.063587E-02 | 6.203839E-02 | -2.801491E-01 | 3.426294E-01 |
| 32 | 0.000000E+00 | -2.098370E-01 | 1.295990E-01 | -8.532556E-02 | -1.759236E-03 |
| 41 | 0.000000E+00 | -3.742564E-01 | 2.180437E-01 | -1.737567E-01 | 5.594646E-04 |
| 42 | 5.220295E-01 | -3.235691E-01 | 2.632152E-01 | -2.693977E-01 | 1.007553E-01 |
| 51 | 0.000000E+00 | -1.770345E-01 | 6.058657E-02 | -1.315330E-02 | 0.000000E+00 |
| 52 | 0.000000E+00 | -6.359951E-02 | -1.500579E-02 | 0.000000E+00 | 0.000000E+00 |
| 61 | 0.000000E+00 | 1.799293E-01 | -2.099357E-01 | 3.276837E-01 | -2.672756E-01 |
| 62 | -5.901562E-01 | 1.749387E-01 | -4.273240E-02 | -1.445158E-02 | 9.842861E-02 |
| 71 | -2.771513E+00 | -2.067178E-01 | 1.326467E-01 | -5.354101E-02 | 6.865740E-03 |
| 72 | -3.919542E+00 | -1.029678E-01 | 6.337259E-02 | -2.735680E-02 | 7.552988E-03 |
| Surface | a12 | a14 | a16 | a18 | a20 |
| 31 | -2.065319E-01 | 0.000000E+00 | 0.000000E+00 | 0.000000E+00 | 0.000000E+00 |
| 32 | 1.458588E-02 | 0.000000E+00 | 0.000000E+00 | 0.000000E+00 | 0.000000E+00 |
| 41 | 4.922625E-02 | 0.000000E+00 | 0.000000E+00 | 0.000000E+00 | 0.000000E+00 |
| 42 | -1.180748E-02 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 1.052141E-01 | -1.557842E-02 | 0.000000E+00 | 0.000000E+00 | 0.000000E+00 |
| 62 | -4.849765E-02 | 8.985148E-03 | 0.000000E+00 | 0.000000E+00 | 0.000000E+00 |
| 71 | 2.777193E-03 | -1.009306E-03 | 9.082139E-05 | -1.846835E-07 | 4.360339E-08 |
| 72 | -1.373488E-03 | 1.537161E-04 | -8.190475E-06 | 4.874676E-08 | -6.395691E-09 |

FIG. 29

| Seventh embodiment |||||||
|---|---|---|---|---|---|---|
| Effective focal length = 2.932 mm , Half field of view= 38.812°, f-number=1.8, System length = 4.413 mm, Image height=2.4 mm |||||||
| Lens element | Surface | Radius of curvature(mm) | Thickness (mm) | Refractive index | Dispersion coefficient | Focal length(mm) |
| Object | | | 1E+13 | | | |
| Aperture stop 2 | | | 0.0006657 | | | |
| First lens element 3 | Object-side surface 31 | 2.451967 | 0.7471818 | 1.5459311 | 56.113793 | 3.6920094 |
| | Image-side surface 32 | -10.10648 | 0.2368423 | | | |
| Second lens element 4 | Object-side surface 41 | 3.2840095 | 0.22 | 1.644569 | 23.517915 | -5.2667 |
| | Image-side surface 42 | 1.6254032 | 0.149364 | | | |
| Third lens element 5 | Object-side surface 51 | 2.6350663 | 0.3097027 | 1.5459311 | 56.113793 | 10.483775 |
| | Image-side surface 52 | 4.6806916 | 0.2189941 | | | |
| Fourth lens element 6 | Object-side surface 61 | -1.886413 | 0.6256583 | 1.5459311 | 56.113793 | 2.7643324 |
| | Image-side surface 62 | -0.936605 | 0.2107622 | | | |
| Fifth lens element 7 | Object-side surface 71 | 1.8715375 | 0.6067188 | 1.5328544 | 55.904307 | -3.943927 |
| | Image-side surface 72 | 0.8783811 | 0.4630541 | | | |
| Filter 9 | Object-side surface 91 | 1E+18 | 0.231525 | 1.518274 | 64.16641 | |
| | Image-side surface 92 | | 0.3937256 | | | |
| | Image plane 100 | | -0.001786 | | | |

FIG. 32

| Surface | K | a4 | a6 | a8 | a10 |
|---|---|---|---|---|---|
| 31 | 4.646951E+00 | -8.237906E-02 | 3.598552E-02 | -2.785570E-01 | 3.546091E-01 |
| 32 | 0.000000E+00 | -1.443717E-01 | 2.185075E-02 | -5.629582E-02 | 3.803918E-02 |
| 41 | 0.000000E+00 | -3.529380E-01 | 1.385293E-01 | -1.597470E-01 | 8.771446E-02 |
| 42 | 5.054876E-01 | -3.584984E-01 | 2.585783E-01 | -2.222254E-01 | 5.706554E-02 |
| 51 | 0.000000E+00 | -1.825925E-01 | 5.399913E-02 | -7.315307E-03 | 0.000000E+00 |
| 52 | 0.000000E+00 | -6.520762E-02 | -9.755883E-03 | 0.000000E+00 | 0.000000E+00 |
| 61 | 0.000000E+00 | 1.759324E-01 | -1.939390E-01 | 4.137830E-01 | -4.371658E-01 |
| 62 | -5.832676E-01 | 1.831843E-01 | -1.183666E-01 | 1.565931E-01 | -7.207404E-02 |
| 71 | -2.771513E+00 | -1.868061E-01 | 1.264525E-01 | -5.373332E-02 | 6.872191E-03 |
| 72 | -3.919542E+00 | -9.884751E-02 | 6.300782E-02 | -2.821132E-02 | 7.655171E-03 |
| Surface | a12 | a14 | a16 | a18 | a20 |
| 31 | -2.421437E-01 | 0.000000E+00 | 0.000000E+00 | 0.000000E+00 | 0.000000E+00 |
| 32 | -2.120914E-02 | 0.000000E+00 | 0.000000E+00 | 0.000000E+00 | 0.000000E+00 |
| 41 | 6.512966E-03 | 0.000000E+00 | 0.000000E+00 | 0.000000E+00 | 0.000000E+00 |
| 42 | 2.685253E-03 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 2.090717E-01 | -3.608454E-02 | 0.000000E+00 | 0.000000E+00 | 0.000000E+00 |
| 62 | 2.653548E-02 | -2.322690E-03 | 0.000000E+00 | 0.000000E+00 | 0.000000E+00 |
| 71 | 2.786268E-03 | -1.005545E-03 | 9.171774E-05 | 1.069677E-07 | -1.044207E-07 |
| 72 | -1.358118E-03 | 1.539041E-04 | -8.457180E-06 | 1.761994E-09 | -3.377689E-09 |

FIG. 33

| Eighth embodiment |||||||
|---|---|---|---|---|---|---|
| Effective focal length = 2.773 mm, Half field of view= 40.239°, f-number=1.595, System length = 4.360 mm, Image height=2.4 mm |||||||
| Lens element | Surface | Radius of curvature(mm) | Thickness (mm) | Refractive index | Dispersion coefficient | Focal length(mm) |
| Object | | | 1E+13 | | | |
| Aperture stop 2 | | | -0.055125 | | | |
| First lens element 3 | Object-side surface 31 | 2.4537586 | 0.7620811 | 1.5459311 | 56.113793 | 4.3028297 |
| | Image-side surface 32 | -49.00979 | 0.1393282 | | | |
| Second lens element 4 | Object-side surface 41 | 2.5854248 | 0.22 | 1.644569 | 23.517915 | -7.325433 |
| | Image-side surface 42 | 1.6246249 | 0.1105412 | | | |
| Third lens element 5 | Object-side surface 51 | 3.014956 | 0.4021995 | 1.5459311 | 56.113793 | 8.1586731 |
| | Image-side surface 52 | 8.8917073 | 0.281841 | | | |
| Fourth lens element 6 | Object-side surface 61 | -1.698501 | 0.617341 | 1.5459311 | 56.113793 | 2.9449008 |
| | Image-side surface 62 | -0.931941 | 0.03 | | | |
| Fifth lens element 7 | Object-side surface 71 | 1.6975739 | 0.6663106 | 1.5328544 | 55.904307 | -4.541561 |
| | Image-side surface 72 | 0.8615734 | 0.482509 | | | |
| Filter 9 | Object-side surface 91 | 1E+18 | 0.231525 | 1.518274 | 64.16641 | |
| | Image-side surface 92 | | 0.4027111 | | | |
| | Image plane 100 | | 0.0136809 | | | |

FIG. 36

| Surface | K | a4 | a6 | a8 | a10 |
|---|---|---|---|---|---|
| 31 | 4.746005E+00 | -8.663613E-02 | 8.503666E-02 | -3.876065E-01 | 4.762374E-01 |
| 32 | 0.000000E+00 | -1.705871E-01 | -8.952543E-03 | 4.939204E-02 | -6.049650E-02 |
| 41 | 0.000000E+00 | -3.286630E-01 | 1.354030E-01 | -1.914629E-01 | 1.100474E-01 |
| 42 | 5.229033E-01 | -3.455831E-01 | 2.750162E-01 | -2.826882E-01 | 1.175430E-01 |
| 51 | 0.000000E+00 | -2.044677E-01 | 1.217156E-01 | -3.969297E-02 | 0.000000E+00 |
| 52 | 0.000000E+00 | -5.882595E-02 | -1.925788E-02 | 0.000000E+00 | 0.000000E+00 |
| 61 | 0.000000E+00 | 2.255785E-01 | -3.354904E-01 | 5.220125E-01 | -4.338316E-01 |
| 62 | -5.878000E-01 | 2.005765E-01 | -1.178906E-01 | 1.144089E-01 | -1.053353E-02 |
| 71 | -2.771513E+00 | -1.943432E-01 | 1.303959E-01 | -5.402333E-02 | 6.815055E-03 |
| 72 | -3.919542E+00 | -9.492658E-02 | 6.127814E-02 | -2.718965E-02 | 7.595291E-03 |
| Surface | a12 | a14 | a16 | a18 | a20 |
| 31 | -2.822066E-01 | 0.000000E+00 | 0.000000E+00 | 0.000000E+00 | 0.000000E+00 |
| 32 | 1.738841E-02 | 0.000000E+00 | 0.000000E+00 | 0.000000E+00 | 0.000000E+00 |
| 41 | -3.014550E-03 | 0.000000E+00 | 0.000000E+00 | 0.000000E+00 | 0.000000E+00 |
| 42 | -1.927859E-02 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 1.763938E-01 | -2.676824E-02 | 0.000000E+00 | 0.000000E+00 | 0.000000E+00 |
| 62 | -5.940481E-03 | 3.145204E-03 | 0.000000E+00 | 0.000000E+00 | 0.000000E+00 |
| 71 | 2.780924E-03 | -1.005481E-03 | 9.200072E-05 | -1.544751E-08 | 1.092835E-09 |
| 72 | -1.376201E-03 | 1.522238E-04 | -8.456767E-06 | 4.095189E-08 | 7.747254E-09 |

FIG. 37

| | First embodiment | Second embodiment | Third embodiment | Fourth embodiment | Fifth embodiment | Sixth embodiment | Seventh embodiment | Eighth embodiment |
|---|---|---|---|---|---|---|---|---|
| T1 | 0.750 | 0.879 | 0.712 | 0.891 | 0.768 | 1.065 | 0.747 | 0.762 |
| G12 | 0.078 | 0.061 | 0.106 | 0.060 | 0.062 | 0.061 | 0.237 | 0.139 |
| T2 | 0.254 | 0.271 | 0.268 | 0.220 | 0.220 | 0.239 | 0.220 | 0.220 |
| G23 | 0.152 | 0.103 | 0.205 | 0.128 | 0.150 | 0.171 | 0.149 | 0.111 |
| T3 | 0.403 | 0.599 | 0.400 | 0.611 | 0.304 | 0.396 | 0.310 | 0.402 |
| G34 | 0.282 | 0.086 | 0.292 | 0.318 | 0.489 | 0.244 | 0.219 | 0.282 |
| T4 | 0.616 | 0.618 | 0.543 | 0.558 | 0.435 | 0.590 | 0.626 | 0.617 |
| G45 | 0.092 | 0.183 | 0.132 | 0.060 | 0.066 | 0.136 | 0.211 | 0.030 |
| T5 | 0.708 | 0.784 | 0.613 | 0.688 | 0.671 | 0.607 | 0.607 | 0.666 |
| G5 | 0.463 | 0.507 | 0.463 | 0.542 | 0.465 | 0.509 | 0.463 | 0.483 |
| TF | 0.232 | 0.232 | 0.232 | 0.232 | 0.232 | 0.232 | 0.232 | 0.232 |
| GFP | 0.400 | 0.318 | 0.411 | 0.443 | 0.461 | 0.443 | 0.394 | 0.403 |
| ALT | 2.731 | 3.151 | 2.537 | 2.968 | 2.397 | 2.898 | 2.509 | 2.668 |
| GAA | 0.604 | 0.433 | 0.734 | 0.566 | 0.768 | 0.613 | 0.816 | 0.562 |
| TTL | 4.429 | 4.640 | 4.376 | 4.751 | 4.323 | 4.694 | 4.414 | 4.346 |
| $\sqrt{\frac{TTL}{EFL}} \times F/\#$ | 2.250 | 2.250 | 2.224 | 2.221 | 2.183 | 2.220 | 2.209 | 1.996 |
| (T3+G34+T4+G45)/T5 | 1.969 | 1.895 | 2.228 | 2.248 | 1.927 | 2.250 | 2.250 | 1.998 |
| EFL/(G12+G45) | 16.694 | 12.176 | 12.072 | 26.000 | 22.998 | 15.643 | 6.550 | 16.376 |
| (T2+G23)/(G12+G45) | 2.390 | 1.533 | 1.993 | 2.900 | 2.900 | 2.081 | 0.825 | 1.952 |
| (T2+T3+T4)/(G12+G45) | 7.500 | 6.101 | 5.101 | 11.577 | 7.500 | 6.208 | 2.581 | 7.320 |
| (T2+G23+T3)/(G12+G45) | 4.764 | 3.990 | 3.678 | 7.991 | 5.276 | 4.088 | 1.517 | 4.327 |
| (T2+AAG)/(G12+G45) | 5.053 | 2.884 | 4.222 | 6.552 | 7.731 | 4.319 | 2.314 | 4.617 |
| (T2+AAG)/T1 | 1.145 | 0.800 | 1.407 | 0.883 | 1.286 | 0.800 | 1.386 | 1.026 |
| (T2+G23+T3)/T1 | 1.079 | 1.107 | 1.226 | 1.077 | 0.878 | 0.757 | 0.909 | 0.961 |
| (T2+T3+T4)/T1 | 1.699 | 1.692 | 1.700 | 1.560 | 1.248 | 1.150 | 1.546 | 1.627 |
| ALT/(T1+G12) | 3.300 | 3.352 | 3.100 | 3.123 | 2.889 | 2.573 | 2.550 | 2.960 |
| ALT/T4 | 4.431 | 5.100 | 4.673 | 5.316 | 5.517 | 4.914 | 4.011 | 4.322 |
| AAG/T4 | 0.980 | 0.700 | 1.352 | 1.014 | 1.767 | 1.039 | 1.304 | 0.910 |
| ALT/T1 | 3.643 | 3.584 | 3.561 | 3.333 | 3.122 | 2.720 | 3.358 | 3.501 |
| ALT/(T4+G45) | 3.856 | 3.934 | 3.761 | 4.800 | 4.790 | 3.991 | 3.000 | 4.121 |
| AAG/(T4+G45) | 0.853 | 0.540 | 1.089 | 0.916 | 1.534 | 0.844 | 0.976 | 0.868 |
| (T2+G23+T3+G34+T4+G45)/T5 | 2.543 | 2.372 | 3.000 | 2.754 | 2.479 | 2.926 | 2.859 | 2.494 |
| (T2+G23+T3+G34)/T5 | 1.542 | 1.351 | 1.900 | 1.855 | 1.733 | 1.731 | 1.480 | 1.523 |

FIG. 38

OPTICAL IMAGING LENS

CROSS-REFERENCE TO RELATED APPLICATION

This application claims the priority benefit of China application serial no. 201610007785.4, filed on Jan. 6, 2016. The entirety of the above-mentioned patent application is hereby incorporated by reference herein and made a part of this specification.

BACKGROUND OF THE INVENTION

Field of the Invention

The invention is related to an optical lens, and particularly to an optical imaging lens.

Description of Related Art

In recent years, as use of portable electronic devices (e.g., mobile phones and digital cameras) becomes ubiquitous, techniques related to producing image modules have also been developed significantly. The image module mainly includes an optical imaging lens, a module holder unit and a sensor. Also, the demand for minimized image module increases due to the compact and slim design of mobile phones and digital cameras. Moreover, as dimensions of a charged coupled device (CCD) and complementary metal-oxide semiconductor (CMOS) are reduced and significant progress in related technology, dimensions of optical imaging lens in the image module are correspondingly reduced. However, to avoid reduction in optical performance and quality, good optical properties should also be achieved while the length of optical imaging lens is shortened. Image quality and size are two of the most important characteristics for an optical imaging lens.

The specification of portable electronic products is ever-changing. The key component, i.e. optical lens set, is also developed diversely, which is not only applied to image-taking and recording, but is also applied to environment monitoring and driving recorder and so on. As image sensing technology advances, consumers' demand for image quality also increases. Accordingly, the design of optical lens set needs to meet the requirement for good image quality and small lens space. In a driving environment with poor light, improvement of the field angle and aperture size should also be taken into consideration.

However, it is not possible to accomplish the design of optical imaging lens with good image quality and micro-sized optical imaging lens by simply scaling down a lens having good image quality. The design process involves consideration about material characteristics and practical issues on the production line such as assembly yield.

Therefore, technical difficulties in manufacturing a micro-sized imaging lens are higher than those of traditional imaging lenses. Producing an optical imaging lens that meets requirements of consumer electronic products with satisfactory optical performance is always a goal in the industry.

SUMMARY OF THE INVENTION

The invention provides an optical imaging lens which can maintain good optical properties while a system length of lens is shortened.

An embodiment of the invention provides an optical imaging lens which includes a first lens element, a second lens element, a third lens element, a fourth lens element and a fifth lens element arranged in sequence from an object side to an image side along an optical axis. Each of the first lens element through the fifth lens element includes an object-side surface that faces the object side and allows imaging rays to pass through as well as an image-side surface that faces the image side and allows the imaging rays to pass through. The image-side surface of the first lens element includes a convex portion in the optical axis region, and at least one of the object-side surface and image-side surface of the first lens element is an aspheric surface. The second lens element has negative refractive power. The object-side surface of the second lens element includes a convex portion in the optical axis region, and at least one of the object-side surface and image-side surface of the second lens element is an aspheric surface. The third lens element has positive refractive power. The image-side surface of the third lens element includes a concave portion in the optical axis region, and at least one of the object-side surface and image-side surface of the third lens element is an aspheric surface. The object-side surface of the fourth lens element includes a concave portion in the optical axis region, and at least one of the object-side surface and image-side surface of the fourth lens element is an aspheric surface. The object-side surface of the fifth lens element includes a convex portion in the optical axis region, and the object-side surface and image-side surface of the fifth lens element are both aspheric surfaces. The number of lens elements of the optical imaging lens that have refractive power is only five; meanwhile, the optical imaging lens satisfies the following condition.

$$\sqrt{\frac{TTL}{EFL}} \times F/\# \leq 2.3$$

wherein TTL represents a distance from the object-side surface of the first lens element to the image plane of the optical imaging lens along the optical axis; EFL represents an effective focal length of the optical imaging lens; F/# represents an f-number of the optical imaging lens.

In an embodiment of the invention, a ratio that is obtained by dividing a distance from the object-side surface of the third lens element to the object-side surface of the fifth lens element along the optical axis by a thickness of the fifth lens element along the optical axis is less than or equal to 2.25.

In an embodiment of the invention, a ratio that is obtained by dividing a distance from the object-side surface of the second lens element to the object-side surface of the fifth lens element along the optical axis by the thickness of the fifth lens element along the optical axis is less than or equal to 3.00.

In an embodiment of the invention, a ratio that is obtained by dividing a distance from the object-side surface of the second lens element to the object-side surface of the fourth lens element along the optical axis by the thickness of the fifth lens element along the optical axis is less than or equal to 1.90.

Based on the above, in the embodiments of the invention, the optical imaging lens can bring the following advantageous effect. With the concave and convex shape design and arrangement of the object-side surface or image-side surface of the lens elements, under the circumstances where the system length of the optical imaging lens is shortened, it is still possible to retain the optical property that can effectively eliminate aberration and provide good image quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic view illustrating a surface structure of a lens element.

FIG. 2 is a schematic view illustrating a concave and convex surface structure of a lens element and a ray focus.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 6 is a schematic view illustrating an optical imaging lens according to a first embodiment of the invention.

FIGS. 7A to 7D are diagrams illustrating longitudinal spherical aberration and other aberrations of the optical imaging lens according to the first embodiment of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 20 shows detailed optical data of the optical imaging lens according to the fourth embodiment of the invention.

FIG. 21 shows aspheric parameters of the optical imaging lens according to the fourth embodiment of the invention.

FIG. 24 shows detailed optical data of the optical imaging lens according to the fifth embodiment of the invention.

FIG. 25 shows aspheric parameters of the optical imaging lens according to the fifth embodiment of the invention.

FIG. 28 shows detailed optical data of the optical imaging lens according to the sixth embodiment of the invention.

FIG. 29 shows aspheric parameters of the optical imaging lens according to the sixth embodiment of the invention.

FIG. 32 shows detailed optical data of the optical imaging lens according to the seventh embodiment of the invention.

FIG. 33 shows aspheric parameters of the optical imaging lens according to the seventh embodiment of the invention.

FIG. 36 shows detailed optical data of the optical imaging lens according to the eighth embodiment of the invention.

FIG. 37 shows aspheric parameters of the optical imaging lens according to the eighth embodiment of the invention.

FIG. 38 shows important parameters and relation values thereof pertaining to the optical imaging leans according to the first through the eighth embodiments of the invention.

DESCRIPTION OF THE EMBODIMENTS

Figure 10:
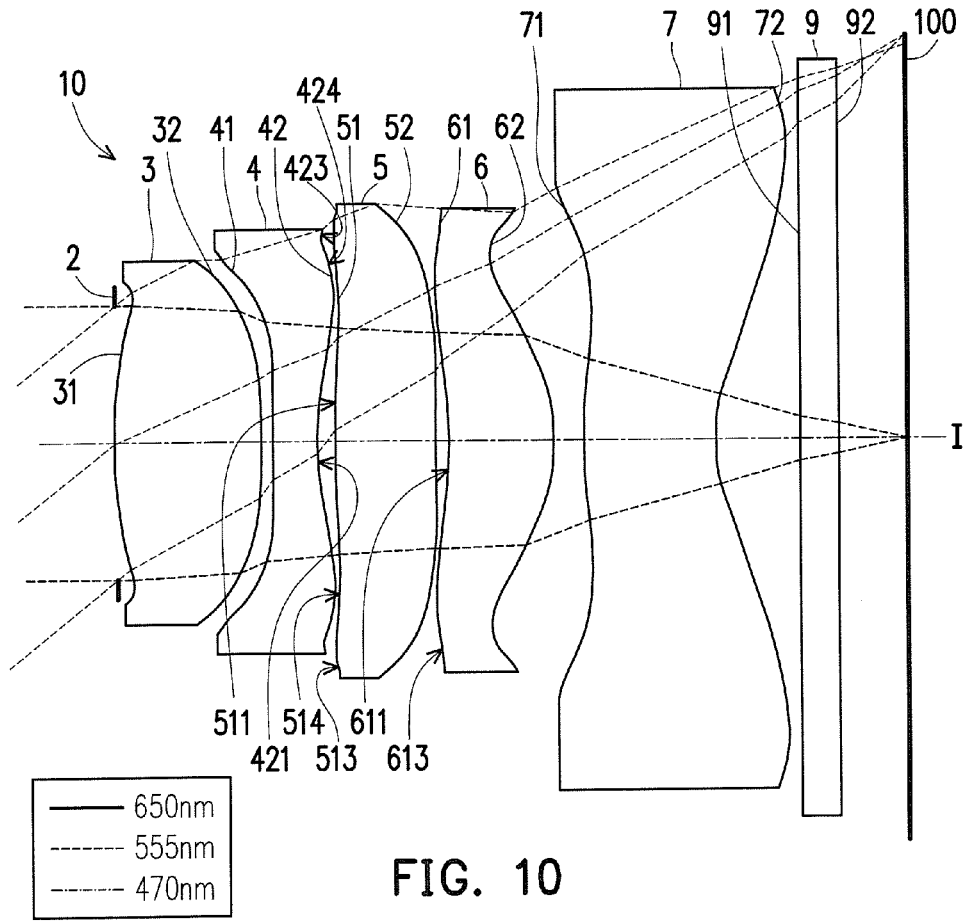
FIG. 10 is a schematic view illustrating an optical imaging lens according to a second embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in an optical axis region", and the region C of the lens element is defined as "a portion in a periphery region". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in an optical axis region, the portion in a periphery region surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in an optical axis region. The portion located radially outside of the Nth transition point (but still within the scope of the clear aperture) is defined as the portion in a periphery region. In some embodiments, there are other portions existing between the portion in an optical axis region and the portion in a periphery region; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in an optical axis region has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in an optical axis region is defined as the portion between 0~50% of the effective radius (radius of the clear aperture) of the surface, whereas the portion in a periphery region is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in an optical axis region, and portion II is a portion in a periphery region. The portion in an optical axis region is determined as having a concave surface due to the R value at the image-side surface of the lens element is positive. The shape of the portion in a periphery region is different from that of the radially inner adjacent portion, i.e. the shape of the portion in a periphery region is different from the shape of the portion in an optical axis region; the portion in a periphery region has a convex shape.

Referring to the second example depicted in FIG. 4, a first transition point and a second transition point exist on the object-side surface (within the clear aperture) of a lens element. In which portion I is the portion in an optical axis region, and portion III is a portion in a periphery region. The portion in an optical axis region has a convex shape because the R value at the object-side surface of the lens element is positive. The portion in a periphery region (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in an optical axis region, and the portion between 50~100% of the effective radius is determined as the portion in a periphery region. The portion in an optical axis region of the object-side surface of the lens element is determined as having a convex shape due to its positive R value, and the portion in a periphery region is determined as having a convex shape as well.

FIG. 6 is a schematic view illustrating an optical imaging lens according to a first embodiment of the invention. FIGS. 7A to 7D are diagrams illustrating longitudinal spherical aberration and other aberrations of the optical imaging lens according to the first embodiment of the invention. Referring to FIG. 6, an optical imaging lens 10 in the first embodiment includes an aperture stop 2, a first lens element 3, a second lens element 4, a third lens element 5, a fourth lens element 6, a fifth lens element 7 and a filter 9 arranged in sequence from an object side to an image side along an optical axis I of the imaging lens 10. When a light emitted from an object to be shot enters the optical imaging lens 10 and passes through the aperture stop 2, first lens element 3, second lens element 4, third lens element 5, fourth lens element 6, fifth lens element 7 and filter 9, an image is formed on an image plane 100. The filter 9 is an infrared cut filter (IR cut filter) configured for preventing the infrared in the light from being transmitted to the image plane 100 and affecting the image quality. It should be added that the object side is at the side of the object to be shot, and the image side is at the side of the image plane 100.

The first lens element 3, second lens element 4, third lens element 5, fourth lens element 6, fifth lens element 7 and filter 9 each has an object-side surfaces 31, 41, 51, 61, 71 and 91 facing the object side and allowing imaging rays to pass through, and an image-side surfaces 32, 42, 52, 62, 72 and 92 facing the image side and allowing the imaging rays to pass through.

In addition, to meet consumers' need for light product, the first lens element 3 through the fifth lens element 7 have refractive power and are formed of plastic material; however, the invention provides no limitation to the material of the first lens element 3 through the fifth lens element 7.

The first lens element 3 has positive refractive power. The object-side surface 31 of the first lens element 3 has a convex portion 311 in the optical axis region I and a concave portion 312 in the periphery region. The image-side surface 32 of the first lens element 3 is a convex surface, and has a convex portion 321 in the optical axis region I and a convex portion 322 in the periphery region. At least one of the object-side surface 31 and image-side surface 32 of the first lens element 3 is an aspheric surface.

The second lens element 4 has negative refractive power. The object-side surface 41 of the second lens element 4 has a convex portion 411 in the optical axis region I and a concave portion 412 in the periphery region. The image-side surface 42 of the second lens element 4 has a concave portion 421 in the optical axis region I and a convex portion 422 in the periphery region. At least one of the object-side surface 41 and image-side surface 42 of the second lens element 4 is an aspheric surface.

The third lens element 5 has positive refractive power. The object-side surface 51 of the third lens element 5 has a convex portion 511 in the optical axis region I and a concave portion 512 in the periphery region. The image-side surface 52 of the third lens element 5 has a concave portion 521 in the optical axis region I and a convex portion 522 in the periphery region. At least one of the object-side surface 51 and image-side surface 52 of the third lens element 5 is an aspheric surface.

The fourth lens element 6 has positive refractive power. The object-side surface 61 of the fourth lens element 6 is a concave surface, and has a concave portion 611 in the optical axis region I and a concave portion 612 in the periphery region. The image-side surface 62 of the fourth lens element 6 has a convex portion 621 in the optical axis region I and a concave portion 622 in the periphery region. At least one of the object-side surface 61 and image-side surface 62 of the fourth lens element 6 is an aspheric surface.

The fifth lens element 7 has negative refractive power. The object-side surface 71 of the fifth lens element 7 has a convex portion 711 in the optical axis region I and a concave portion 712 in the periphery region. The image-side surface 72 of the fifth lens element 7 has a concave portion 721 in the optical axis region I and a convex portion 722 in the periphery region. The object-side surface 71 and image-side surface 72 of the fifth lens element 7 are both aspheric surfaces.

In the embodiment, all the object-side surfaces 31, 41, 51, 61 and 71 and all the image-side surfaces 32, 42, 52, 62 and 72 are aspheric surfaces.

In the first embodiment, only the lens elements described above have refractive power; and the number of lens elements that have refractive power is only five.

The detailed optical data in the first embodiment is described in FIG. 8. In the first embodiment, an effective focal length (EFL) of the optical imaging lens 10 is 2.834 mm; the half field of view (HFOV) thereof is 39.741°; the f-number (Fno) thereof is 1.8; the system length of the optical imaging lens 10 is 4.429 mm, and the image height thereof is 2.4 mm. The system length refers to a distance from the object-side surface 31 of the first lens element 3 to the image plane 100 along the optical axis I.

In addition, in the embodiment, a total of ten surfaces, namely the object-side surfaces 31, 41, 51, 61 and 71 and image-side surfaces 32, 42, 52, 62 and 72 of the first lens element 3, second lens element 4, third lens element 5, fourth lens element 6 and fifth lens element 7 are aspheric surfaces. The aspheric surfaces are defined by the following formula.

$$Z(Y) = \frac{Y^2}{R}\left(1 + \sqrt{1 - (1+K)\frac{Y^2}{R^2}}\right) + \sum_{i=1}^{n} a_i \times Y^i \quad (1)$$

wherein:
Y: a distance from a point on an aspheric curve to the optical axis I;
Z: a depth of the aspheric surface (i.e. a perpendicular distance between the point on the aspheric surface that is spaced by the distance Y from the optical axis I and a tangent plane tangent to a vertex of the aspheric surface on the optical axis I);
R: radius of curvature of the surface of the lens element near the optical axis I;
K: conic constant
$a_i$: $i^{th}$ aspheric coefficient The aspheric coefficients of the object-side surface 31 of the first lens element 3 through the image-side surface 72 of the fifth lens element 7 in the formula (1) are as indicated in FIG. 9, wherein the field referential number 31 in FIG. 9 represents the aspheric coefficient of the object-side surface 31 of the first lens element 3 and so forth.

In addition, the relations among important parameters pertaining to the optical imaging lens 10 in the first embodiment are as indicated in FIG. 38.
wherein,
T1 represents the thickness of the first lens element 3 along the optical axis I;
T2 represents the thickness of the second lens element 4 along the optical axis
T3 represents the thickness of the third lens element 5 along the optical axis I;

T4 represents the thickness of the fourth lens element 6 along the optical axis I;

T5 represents the thickness of the fifth lens element 7 along the optical axis I;

G12 represents an air gap between the first lens element 3 and the second lens element 4 along the optical axis I;

G23 represents an air gap between the second lens element 4 and the third lens element 5 along the optical axis I;

G34 represents an air gap between the third lens element 5 and the fourth lens element 6 along the optical axis I;

G45 represents an air gap between the fourth lens element 6 and the fifth lens element 7 along the optical axis I;

AAG represents a sum of four air gaps among the first lens element 3 through the fifth lens element 7 along the optical axis I, i.e. the sum of G12, G23, G34 and G45;

ALT represents a sum of the thickness of the first lens element 3, second lens element 4, third lens element 5, fourth lens element 6 and fifth lens element 7 along the optical axis I, i.e. the sum of T1, T2, T3, T4 and T5;

TTL represents a distance from the object-side surface 31 of the first lens element 3 to the image plane 100 along the optical axis I;

BFL represents a distance from the image-side surface 72 of the fifth lens element 7 to the image plane 100 along the optical axis I; and EFL represents an effective focal length of the optical imaging lens 10.

In addition, it is defined that:

G5F represents an air gap between the fifth lens element 7 and the filter 9 along the optical axis I;

TF represents a thickness of the filter 9 along the optical axis I;

GFP represents an air gap between the filter 9 and the image plane 100 along the optical axis I;

f1 is a focal length of the first lens element 3;
f2 is a focal length of the second lens element 4;
f3 is a focal length of the third lens element 5;
f4 is a focal length of the fourth lens element 6;
f5 is a focal length of the fifth lens element 7;
n1 is a refractive index of the first lens element 3;
n2 is a refractive index of the second lens element 4;
n3 is a refractive index of the third lens element 5;
n4 is a refractive index of the fourth lens element 6;
n5 is a refractive index of the fifth lens element 7;
v1 is an Abbe number of the first lens element 3, the Abbe number may also be referred as dispersion coefficient;
v2 is an Abbe number of the second lens element 4;
v3 is an Abbe number of the third lens element 5;
v4 is an Abbe number of the fourth lens element 6; and
v5 is an Abbe number of the fifth lens element 7.

Further referring to FIGS. 7A to 7D, FIG. 7A illustrates the longitudinal spherical aberration of the first embodiment. FIGS. 7B to 7C are diagrams respectively illustrating astigmatism aberration regarding sagittal direction on the image plane 100 and astigmatism aberration regarding the tangential direction on the image plane 100 in the first embodiment. FIG. 7D is a diagram illustrating distortion aberration on the image plane 100 in the first embodiment. In FIG. 7A which describes the longitudinal spherical aberration in the first embodiment, the curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within ±0.016 mm. Accordingly, it is evident that the embodiment can significantly improve the spherical aberration of the same wavelength. In addition, the curves of the three representative wavelengths are close to one another, which represents that the imaging positions of the rays with different wavelengths are concentrated; therefore, the chromatic aberration can be significantly improved.

In FIGS. 7B and 7C which illustrate two diagrams of astigmatism aberration, the focal length variation of the three representative wavelengths in the entire field of view falls within ±0.045 mm, which represents that the optical system in the first embodiment can effectively eliminate aberration. In FIG. 7D, the diagram of distortion aberration shows that the distortion aberration in the first embodiment can be maintained within ±2.5%, which shows that the distortion aberration in the first embodiment can meet the image quality requirement of the optical system. Based on the above, it is shown that the first embodiment can provide better image quality compared with existing optical lens under the condition where the system length of the optical lens is shortened to about 4.429 mm. Therefore, the first embodiment can have shorter lens length and broader shooting angle while maintaining good optical properties to realize slim design of product with broadened view angle.

FIG. 10 is a schematic view illustrating an optical imaging lens according to a second embodiment of the invention. FIGS. 11A to 11D are diagrams illustrating longitudinal spherical aberration and other aberrations of the optical imaging lens according to the second embodiment of the invention. Referring to FIG. 10, the second embodiment of the optical imaging lens 10 of the invention is similar to the first embodiment, the difference lies in optical data, aspheric coefficients and the parameters of the lens elements 3, 4, 5, 6 and 7. Also, another difference lies in that the image-side surface 42 of the second lens element 4 has the concave portion 421 in the optical axis region I, a concave portion 423 in the periphery region and a convex portion 424 between the concave portion 421 and the concave portion 423. The object-side surface 51 of the third lens element 5 has a convex portion 511 in the optical axis region I, a convex portion 513 in the periphery region and a concave portion 514 between the convex portion 511 and the convex portion 513. The object-side surface 61 of the fourth lens element 6 has a concave portion 611 in the optical axis region I and a convex portion 613 in the periphery region. It should be noted that, in order to show the view clearly, some numerals which are the same as those used for the concave portion and convex portion in the first embodiment are omitted from FIG. 10.

The detailed optical data pertaining to the optical imaging lens 10 is as shown in FIG. 12. An effective focal length of the optical imaging lens 10 of the second embodiment is 2.970 mm, the HFOV thereof is 38.727°, Fno thereof is 1.8, and the system length thereof is 4.639 mm.

FIG. 13 shows the aspheric coefficients of the object-side surface 31 of the first lens element 3 through the image-side surface 72 of the fifth lens element 7 in the second embodiment in the formula (1).

In addition, the relation among the important parameters of the optical imaging lens 10 in the second embodiment is as shown in FIG. 38.

Figures 11A, 11B, 11C, 11D:
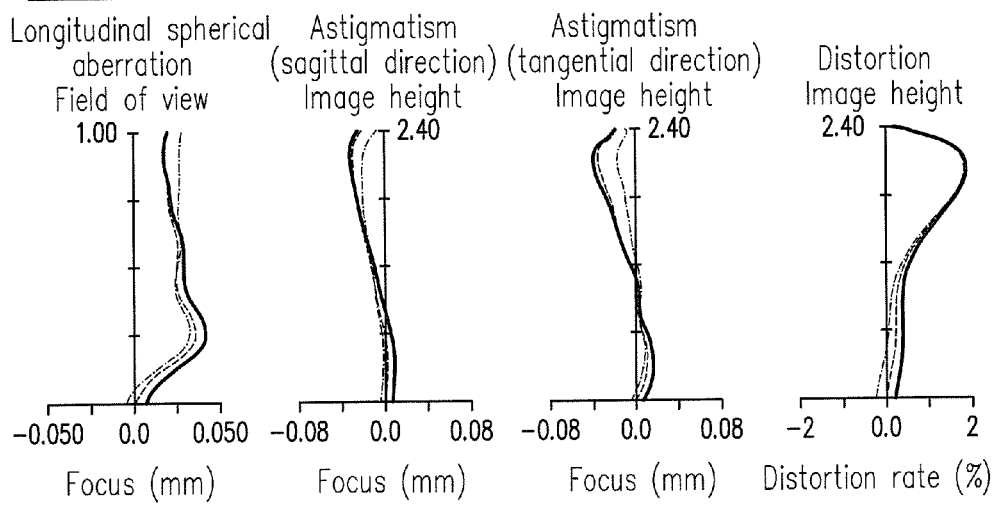
FIGS. 11A to 11D are diagrams illustrating longitudinal spherical aberration and other aberrations of the optical imaging lens according to the second embodiment of the invention.

Further referring to FIGS. 11A to 11D, the longitudinal spherical aberration in FIG. 11A, the astigmatism aberration shown in FIG. 11B and FIG. 11C, and the distortion aberration shown by FIG. 11D also show that the second embodiment of the invention can maintain good optical properties.

Based on the above, it can be obtained that the advantage of the second embodiment relative to the first embodiment lies in that the second embodiment can be manufactured more easily than the first embodiment; therefore, a higher yield rate can be achieved.

Figure 14:
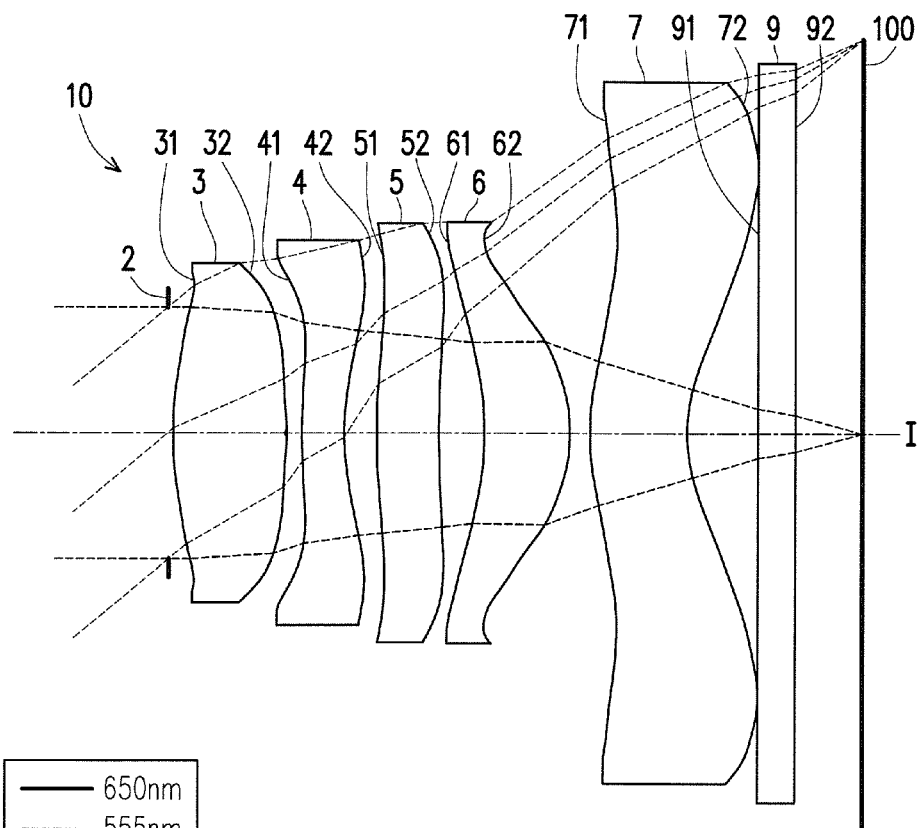
FIG. 14 is a schematic view illustrating an optical imaging lens according to a third embodiment of the invention.

FIG. 14 is a schematic view illustrating an optical imaging lens according to a third embodiment of the invention. FIGS. 15A to 15D are diagrams illustrating longitudinal spherical aberration and other aberrations of the optical imaging lens according to the third embodiment of the invention. Referring to FIG. 14, the third embodiment of the optical imaging lens 10 of the invention is similar to the first embodiment; the difference lies in optical data, aspheric coefficients and the parameters of the lens elements 3, 4, 5, 6 and 7. It should be noted that, in order to show the view clearly, some numerals which the same as those used for the concave portion and convex portion in the first embodiment are omitted from FIG. 14.

The detailed optical data of the optical imaging lens 10 is as shown in FIG. 16. An effective focal length of the optical imaging lens 10 of the third embodiment is 2.866 mm, the HFOV thereof is 39.466°, Fno thereof is 1.8, and the system length thereof is 4.375 mm.

FIG. 17 shows the aspheric coefficients of the object-side surface 31 of the first lens element 3 through the image-side surface 72 of the fifth lens element 7 in the third embodiment in the formula (1).

In addition, the relation among the important parameters of the optical imaging lens 10 in the third embodiment is as shown in FIG. 38.

Figure 15A:
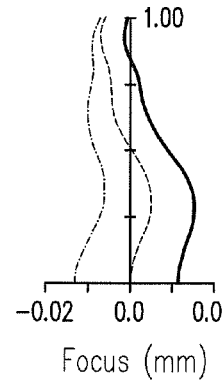
FIGS. 15A to 15D are diagrams illustrating longitudinal spherical aberration and other aberrations of the optical imaging lens according to the third embodiment of the invention.
Figure 15B:
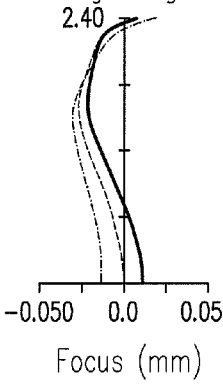
Figure 15C:
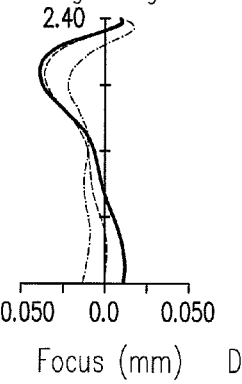
Figure 15D:
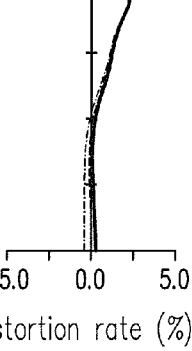

Further referring to FIGS. 15A to 15D, the longitudinal spherical aberration in FIG. 15A, the astigmatism aberration shown in FIG. 15B and FIG. 15C, and the distortion aberration shown by FIG. 15D also show that the third embodiment of the invention can maintain good optical properties.

Based on the above, it can be obtained that the advantage of the third embodiment relative to the first embodiment lies in that the system length of the third embodiment is shorter than the first embodiment, and the third embodiment can be manufactured more easily than the first embodiment; therefore, a higher yield rate can be achieved.

Figure 18:
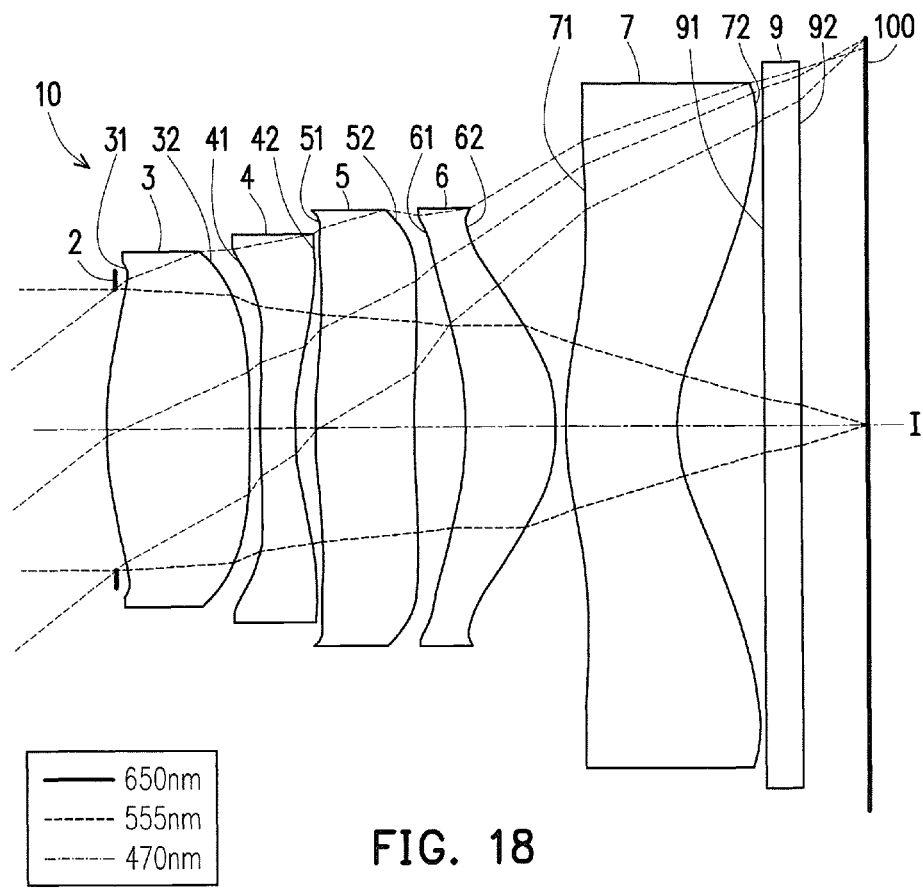
FIG. 18 is a schematic view illustrating an optical imaging lens according to a fourth embodiment of the invention.

FIG. 18 is a schematic view illustrating an optical imaging lens according to a fourth embodiment of the invention. FIGS. 19A to 19D are diagrams illustrating longitudinal spherical aberration and other aberrations of the optical imaging lens according to the fourth embodiment of the invention. Referring to FIG. 18, the fourth embodiment of the optical imaging lens 10 of the invention is similar to the first embodiment; the difference lies in optical data, aspheric coefficients and the parameters of the lens elements 3, 4, 5, 6 and 7. It should be noted that, in order to show the view clearly, some numerals which are the same as those used for the concave portion and convex portion in the first embodiment are omitted from FIG. 18.

The detailed optical data of the optical imaging lens 10 is as shown in FIG. 20. An effective focal length of the optical imaging lens 10 of the fourth embodiment is 3.12 mm, the HFOV thereof is 38°, Fno thereof is 1.8, and the system length thereof is 4.750 mm.

FIG. 21 shows the aspheric coefficients of the object-side surface 31 of the first lens element 3 though the image-side surface 72 of the fifth lens element 7 in the fourth embodiment in the formula (1).

In addition, the relation among the important parameters of the optical imaging lens 10 in the fourth embodiment is as shown in FIG. 38.

Figures 19A, 19B, 19C, 19D:
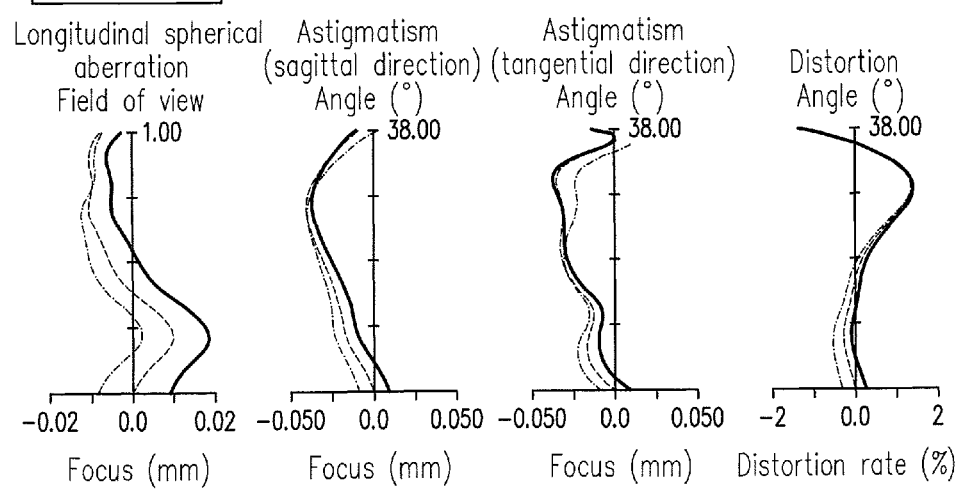
FIGS. 19A to 19D are diagrams illustrating longitudinal spherical aberration and other aberrations of the optical imaging lens according to the fourth embodiment of the invention.

Further referring to FIGS. 19A to 19D, the longitudinal spherical aberration in FIG. 19A, the astigmatism aberration shown in FIG. 19B and FIG. 19C, and the distortion aberration shown by FIG. 19D also show that the fourth embodiment of the invention can maintain good optical properties.

Based on the above, it can be obtained that the advantage of the fourth embodiment relative to the first embodiment lies in that the distortion aberration of the fourth embodiment is less than that of the first embodiment, and the fourth embodiment can be manufactured more easily than the first embodiment; therefore, a higher yield rate can be achieved.

Figure 22:
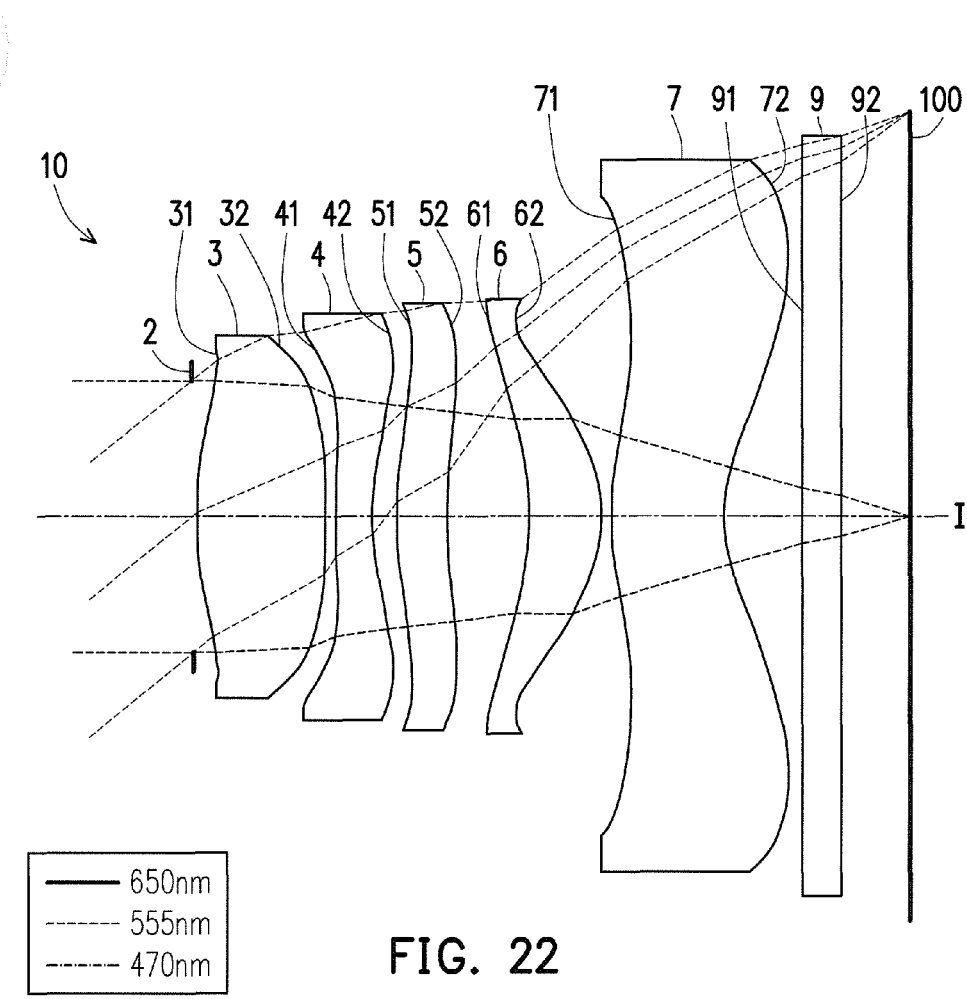
FIG. 22 is a schematic view illustrating an optical imaging lens according to a fifth embodiment of the invention.

FIG. 22 is a schematic view illustrating an optical imaging lens according to a fifth embodiment of the invention. FIGS. 23A to 23D are diagrams illustrating longitudinal spherical aberration and other aberrations of the optical imaging lens according to the fifth embodiment of the invention. Referring to FIG. 22, the fifth embodiment of the optical imaging lens 10 of the invention is similar to the first embodiment; the difference lies in optical data, aspheric coefficients and the parameters of the lens elements 3, 4, 5, 6 and 7. It should be noted that, in order to show the view clearly, some numerals which are the same as those used for the concave portion and convex portion in the first embodiment are omitted from FIG. 22.

The detailed optical data of the optical imaging lens 10 is as shown in FIG. 24. An effective focal length of the optical imaging lens 10 of the fifth embodiment is 2.938 mm, the HFOV thereof is 38.775°, Fno thereof is 1.8, and the system length thereof is 4.422 mm.

FIG. 25 shows the aspheric coefficients of the object-side surface 31 of the first lens element 3 through the image-side surface 72 of the fifth lens element 7 of the fifth embodiment in the formula (1).

In addition, the relation among the important parameters of the optical imaging lens 10 in the fifth embodiment is as shown in FIG. 38.

Figures 23A, 23B, 23C, 23D:
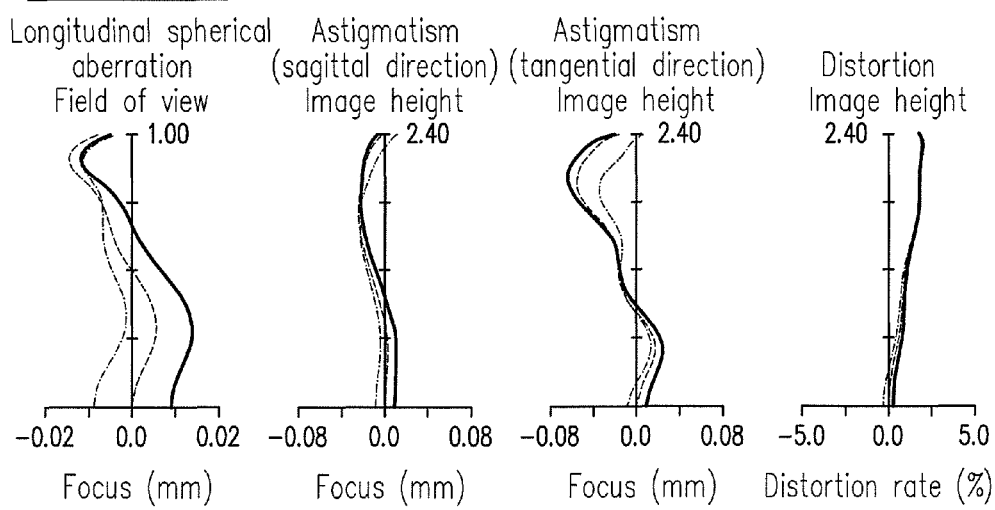
FIGS. 23A to 23D are diagrams illustrating longitudinal spherical aberration and other aberrations of the optical imaging lens according to the fifth embodiment of the invention.

Further referring to FIGS. 23A to 23D, the longitudinal spherical aberration in FIG. 23A, the astigmatism aberration shown in FIG. 23B and FIG. 23C, and the distortion aberration shown by FIG. 23D also show that the fifth embodiment of the invention can maintain good optical properties.

Based on the above, it can be obtained that the advantage of the fifth embodiment relative to the first embodiment lies in that the system length of the fifth embodiment is shorter than that of the first embodiment, and the fifth embodiment can be manufactured more easily than the first embodiment; therefore, a higher yield rate can be achieved.

Figure 26:
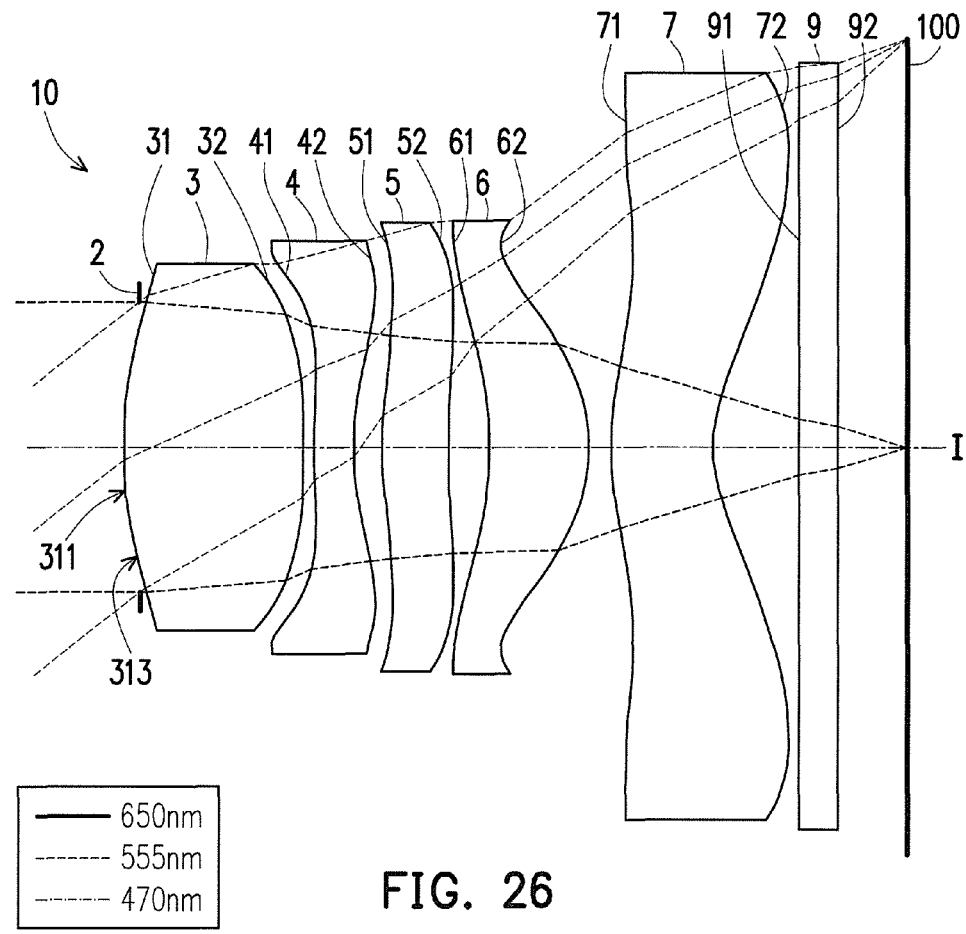
FIG. 26 is a schematic view illustrating an optical imaging lens according to a sixth embodiment of the invention.

FIG. 26 is a schematic view illustrating an optical imaging lens according to a sixth embodiment of the invention. FIGS. 27A to 27D are diagrams illustrating longitudinal spherical aberration and other aberrations of the optical imaging lens according to the sixth embodiment of the invention. Referring to FIG. 26, the sixth embodiment of the optical imaging lens 10 of the invention is similar to the first embodiment; the difference lies in optical data, aspheric coefficients and the parameters of the lens elements 3, 4, 5, 6 and 7. Meanwhile, the object-side surface 31 of the first lens element 3 is a convex surface. The object-side surface 31 of the first lens element 3 has the convex portion 311 in the optical axis region I and a convex portion 313 in the periphery region. It should be noted that, in order to show the view clearly, some numerals which are the same as those used for the concave portion and convex portion in the first embodiment are omitted from FIG. 26.

The detailed optical data of the optical imaging lens 10 is as shown in FIG. 28. An effective focal length of the optical imaging lens 10 of the six embodiment is 3.087 mm, the HFOV thereof is 38°, Fno thereof is 1.8, and the system length thereof is 4.693 mm.

FIG. 29 shows the aspheric coefficients of the object-side surface 31 of the first lens element 3 through the image-side surface 72 of the fifth lens element 7 of the sixth embodiment in the formula (1).

In addition, the relation among the important parameters of the optical imaging lens 10 in the sixth embodiment is as shown in FIG. 38.

Figures 27A, 27B, 27C, 27D:
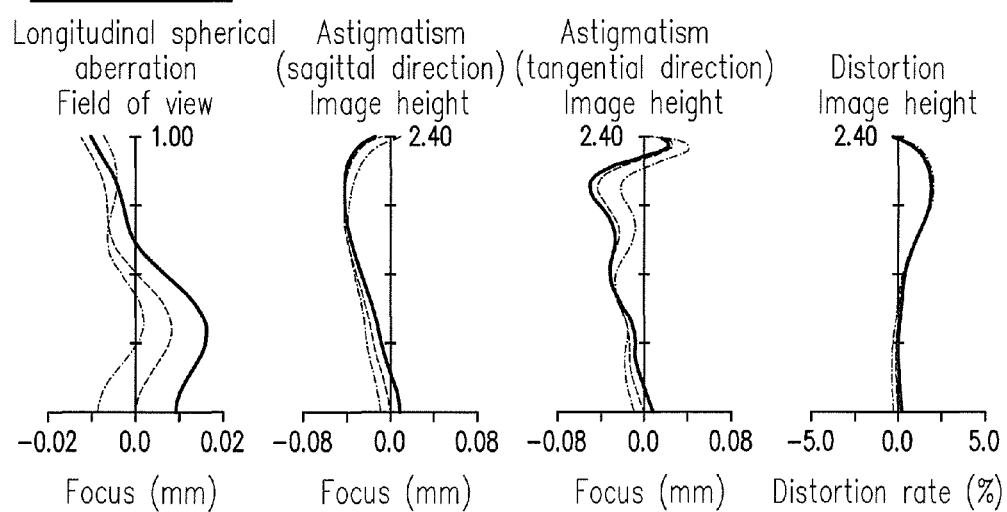
FIGS. 27A to 27D are diagrams illustrating longitudinal spherical aberration and other aberrations of the optical imaging lens according to the sixth embodiment of the invention.

Further referring to FIGS. 27A to 27D, the longitudinal spherical aberration in FIG. 27A, the astigmatism aberration shown in FIG. 27B and FIG. 27C, and the distortion aberration shown by FIG. 27D also show that the sixth embodiment of the invention can maintain good optical properties.

Based on the above, it can be obtained that the advantage of the sixth embodiment relative to the first embodiment lies in that the sixth embodiment can be manufactured more easily than the first embodiment; therefore, a higher yield rate can be achieved.

Figure 30:
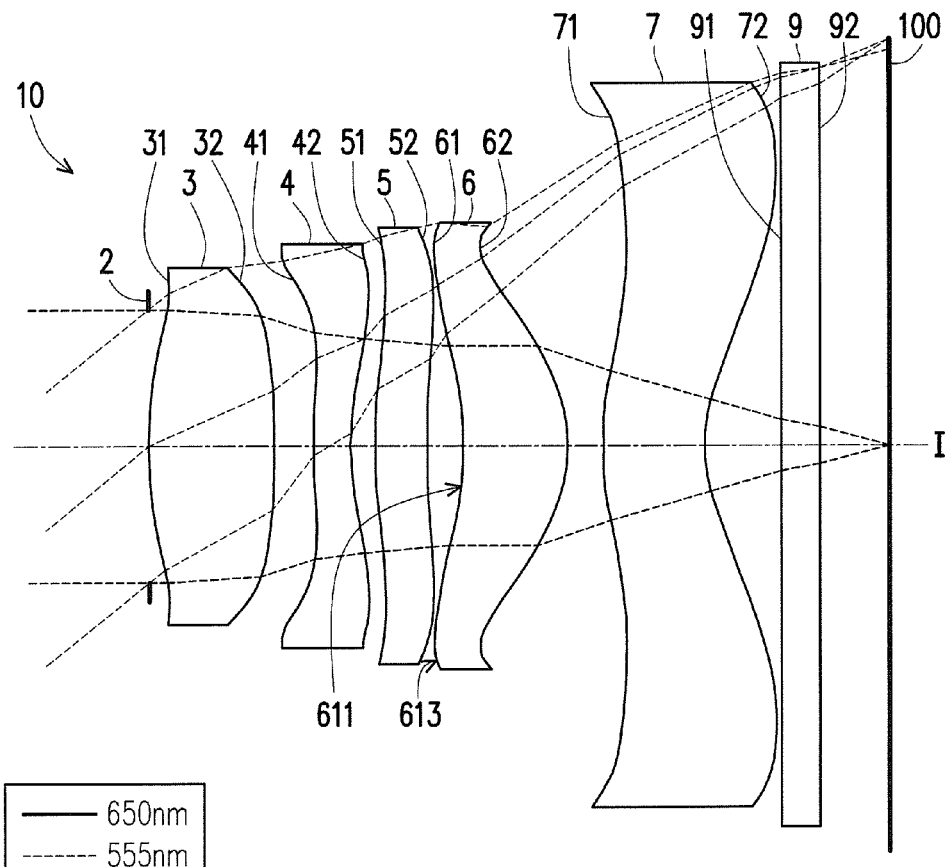
FIG. 30 is a schematic view illustrating an optical imaging lens according to a seventh embodiment of the invention.

FIG. 30 is a schematic view illustrating an optical imaging lens according to a seventh embodiment of the invention. FIGS. 31A to 31D are diagrams illustrating longitudinal spherical aberration and other aberrations of the optical imaging lens according to the seventh embodiment of the invention. Referring to FIG. 30, the seventh embodiment of the optical imaging lens 10 of the invention is similar to the first embodiment; the difference lies in optical data, aspheric coefficients and the parameters of the lens elements 3, 4, 5, 6 and 7. Meanwhile, the object-side surface 61 of the fourth lens element 6 has a concave portion 611 in the optical axis region I and a convex portion 613 in the periphery region. It should be noted that, in order to show the view clearly, some numerals which are the same as those used for the concave portion and convex portion in the first embodiment are omitted from FIG. 30.

The detailed optical data of the optical imaging lens 10 is as shown in FIG. 32. An effective focal length of the optical imaging lens 10 of the seventh embodiment is 2.932 mm, the HFOV thereof is 38.812°, Fno thereof is 1.8, and the system length thereof is 4.413 mm.

FIG. 33 shows the aspheric coefficients of the object-side surface 31 of the first lens element 3 through the image-side surface 72 of the fifth lens element 7 of the seventh embodiment in the formula (1).

In addition, the relation among the important parameters of the optical imaging lens 10 in the seventh embodiment is as shown in FIG. 38.

Figures 31A, 31B, 31C, 31D:
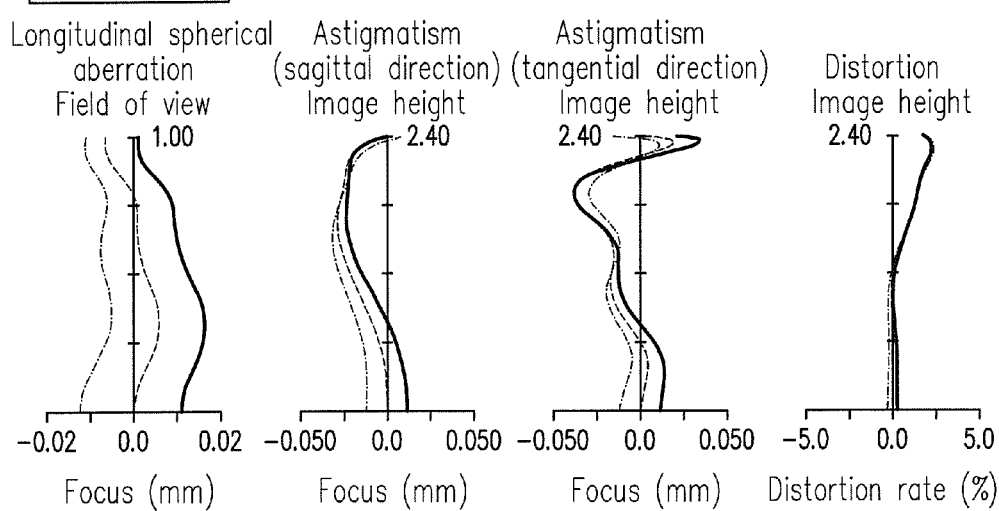
FIGS. 31A to 31D are diagrams illustrating longitudinal spherical aberration and other aberrations of the optical imaging lens according to the seventh embodiment of the invention.

Further referring to FIGS. 31A to 31D, the longitudinal spherical aberration in FIG. 31A, the astigmatism aberration shown in FIG. 31B and FIG. 31C, and the distortion aberration shown by FIG. 31D also show that the seventh embodiment of the invention can maintain good optical properties.

Based on the above, it can be obtained that the advantage of the seventh embodiment relative to the first embodiment lies in that the system length of the seventh embodiment is shorter than that of the first embodiment, and the seventh embodiment can be manufactured more easily than the first embodiment; therefore, a higher yield rate can be achieved.

Figure 34:
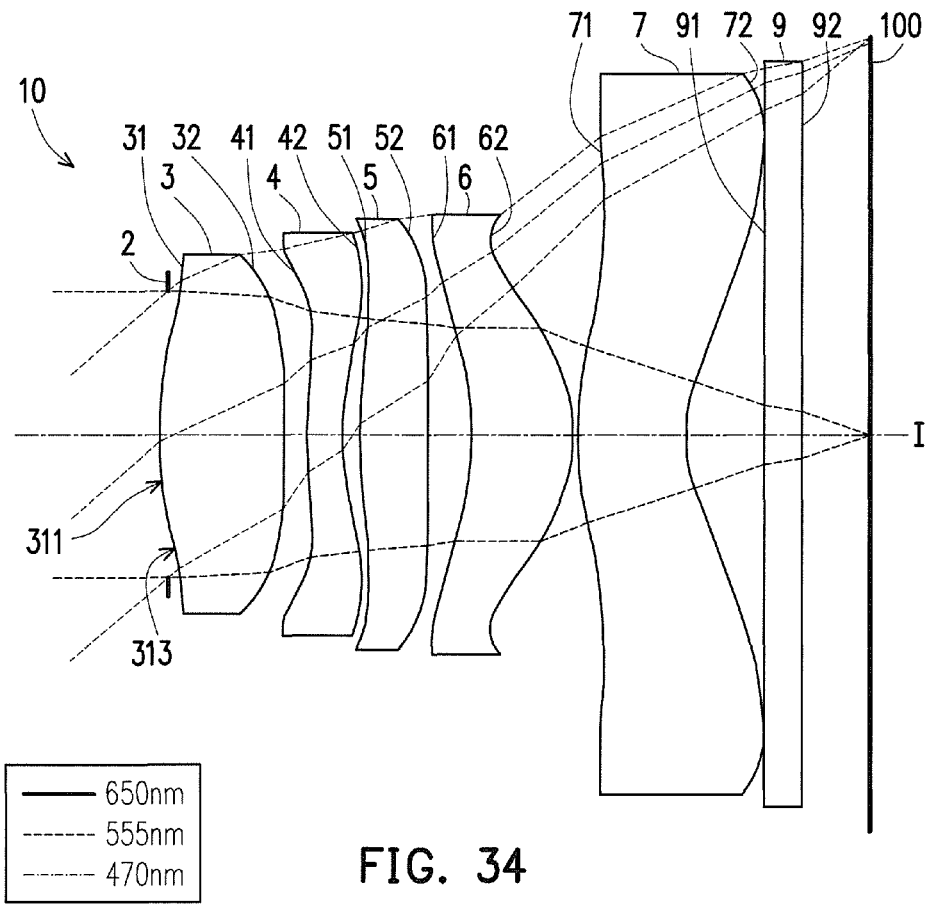
FIG. 34 is a schematic view illustrating an optical imaging lens according to an eighth embodiment of the invention.

FIG. 34 is a schematic view illustrating an optical imaging lens according to an eighth embodiment of the invention. FIGS. 35A to 35D are diagrams illustrating longitudinal spherical aberration and other aberrations of the optical imaging lens according to the eighth embodiment of the invention. Referring to FIG. 34, the eighth embodiment of the optical imaging lens 10 of the invention is similar to the first embodiment; the difference lies in optical data, aspheric coefficients and the parameters of the lens elements 3, 4, 5, 6 and 7. Meanwhile, the object-side surface 31 of the first lens element 3 is a convex surface. The object-side surface 31 of the first lens element 3 has the convex portion 311 in the optical axis region I and a convex portion 313 in the periphery region. It should be noted that, in order to show the view clearly, some numerals which are the same as those used for the concave portion and convex portion in the first embodiment are omitted from FIG. 34.

The detailed optical data of the optical imaging lens 10 is as shown in FIG. 36. An effective focal length of the optical imaging lens 10 of the eighth embodiment is 2.773 mm, the HFOV thereof is 40.239°, Fno thereof is 1.595, and the system length thereof is 4.360 mm.

FIG. 37 shows the aspheric coefficients of the object-side surface 31 of the first lens element 3 through the image-side surface 72 of the fifth lens element 7 of the eighth embodiment in the formula (1).

In addition, the relation among the important parameters of the optical imaging lens 10 in the eighth embodiment is as shown in FIG. 38.

Figures 35A, 35B, 35C, 35D:
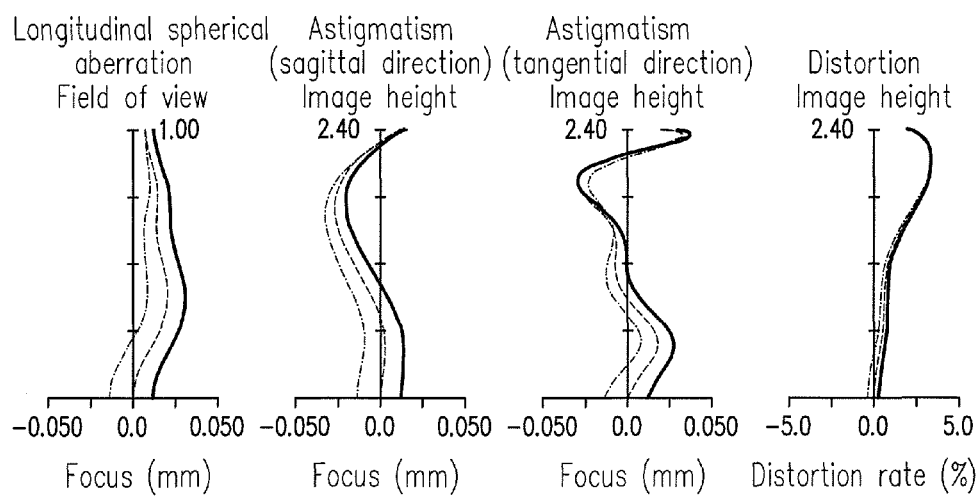
FIGS. 35A to 35D are diagrams illustrating longitudinal spherical aberration and other aberrations of the optical imaging lens according to the eighth embodiment of the invention.

Further referring to FIGS. 35A to 35D, the longitudinal spherical aberration in FIG. 35A, the astigmatism aberration shown in FIG. 35B and FIG. 35C, and the distortion aberration shown by FIG. 35D also show that the eighth embodiment of the invention can maintain good optical properties.

Based on the above, it can be obtained that the advantage of the eighth embodiment relative to the first embodiment lies in that the system length of the eighth embodiment is shorter than that of the first embodiment; the f-number of the eighth embodiment is smaller than that of the first embodiment, i.e. the aperture of the eighth embodiment is bigger than that of the first embodiment; the HFOV of the eighth embodiment is larger than that of the first embodiment; and the eighth embodiment can be manufactured more easily than the first embodiment; therefore, a higher yield rate can be achieved.

FIG. 38 shows a table which lists the optical parameters of the eight embodiments described above. Under the condition where the relation among the optical parameters of the optical imaging lens 10 in the embodiments of the invention satisfies at least one of the following conditional expressions, a better optical property performance can be achieved:

1. Under the circumstances where the conditional expression $$\sqrt{\frac{TTL}{EFL}} \times F/\# \leq 2.3$$

is satisfied, it is easier for a light entering aperture to be added without increasing the length of lens and facilitate design of a lens with a large aperture. It is more preferable to satisfy $$1.8 \leq \sqrt{\frac{TTL}{EFL}} \times F/\# \leq 2.3.$$

2. Under the condition where a ratio obtained by dividing a distance from the object-side surface 51 of the third lens element 5 to the object-side surface 71 of the fifth lens element 7 along the optical axis I by the thickness (i.e. T5) of the fifth lens element 7 along the optical axis I is less than or equal to 2.25; a ratio obtained by dividing a distance from the object-side surface 41 of the second lens element 4 to the object-side surface 71 of the fifth lens element 7 along the optical axis I by the thickness (i.e. T5) of the fifth lens element 7 along the optical axis I is less than or equal to 3.00; or a ratio obtained by dividing a distance from the object-side surface 41 of the second lens element 4 to the object-side surface 61 of the fourth lens element 6 along the optical axis I by the thickness (i.e. T5) of the fifth lens element 7 along the optical axis I is less than or equal to 1.90, it is easier to increase the thickness of the fifth lens element 7 so as to correct the aberration generated by the four former lens elements and keep the thickness of the fifth lens element 7 from being too thin and thus increase yield rate. Preferably, under the condition where a ratio obtained by dividing a distance from the object-side surface 51 of the third lens element 5 to the object-side surface 71 of the fifth lens element 7 along the optical axis I by the thickness (i.e. T5) of the fifth lens element 7 along the optical axis I is less than or equal to 2.25 and larger than or equal to 1.20; a ratio obtained by dividing a distance from the object-side surface 41 of the second lens element 4 to the object-side surface 71 of the fifth lens element 7 along the optical axis I by the thickness (i.e. T5) of the fifth lens element 7 along the optical axis I is less than or equal to 3.00 and larger than or equal to 2.00; or a ratio obtained by dividing a distance from the object-side surface 41 of the second lens element 4 to the object-side surface 61 of the fourth lens element 6 along the optical axis I by the thickness (i.e. T5) of the fifth lens element 7 along the optical axis is less than or equal to 1.90 and larger than 1.30, the thicknesses of and distances between the former four lens elements can be kept from being too small and avoid reducing yield rate.

3. Under the condition where EFL/(G12+G45)≤27.00 is satisfied, by limiting the relation between the focal length and the distance between the first lens element 3 and the final lens element (i.e. the fifth lens element 7), G12 and G45 can be kept from being too small so that coma and curvature of field can be reduced. It is more preferable to satisfy 6.00≤EFL/(G12+G45)≤27.00.

4. Under the condition where (T2+G23)/(G12+G45)≤2.90, (T2+T3+T4)/(G12+G45)≤7.50, (T2+G23+T3)/(G12+G45)≤8.00, (T2+AAG)/(G12+G45)≤8.00, (T2+AAG)/T1≤1.60, (T2+G23+T3)/T1≤1.50, (T2+T3+T4)/T1≤1.70, ALT/(T1+G12)≤3.60, ALT/T4≤5.10, AAG/T4≤1.70, ALT/T1≤4.00, ALT/(T4+G45)≤4.80 and AAG/(T4+G45)≤1.60 are satisfied, preferably the conditions are limited as 0.70≤(T2+G23)/(G12+G45)≤2.90, 2.00≤(T2+T3+T4)/(G12+G45)≤7.50, 1.40≤(T2+G23+T3)/(G12+G45)≤8.00, 2.20≤(T2+AAG)/(G12+G45)≤8.00, 0.80≤(T2+AAG)/T1≤1.60, 0.60≤(T2+G23+T3)/T1≤1.50, 1.10≤(T2+T3+T4)/T1≤1.70, 2.55≤ALT/(T1+G12)≤3.60, 2.50 ALT/T4≤5.10, 0.50≤AAG/T4≤1.70, 2.70≤ALT/T1≤4.00, 2.10≤ALT/(T4+G45)≤4.80 and 0.50≤AAG/(T4+G45)≤1.60, such that the thickness of each lens element can be maintain within a suitable value so as to prevent any one of the parameters from being too large and causing difficulty in achieving slim design of the overall optical imaging lens 10, or prevent any one of the parameters from being too small and making it difficult to assemble or manufacture the optical imaging lens 10.

However, due to the unpredictability in the design of an optical system, with the framework of the embodiments of the invention, under the circumstances where the above-described conditions are satisfied, the lens according to the embodiments of the invention with shorter length, bigger aperture availability, increased field of angle, improved image quality or better yield rate can be preferably achieved so as to improve the shortcoming of prior art.

The above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form a convex portion in the optical axis region I and a concave portion in the periphery region on the image-side surface 42 of the second lens element 4. It should be noted that the above-described details can be optionally combined and applied to the other embodiments of the invention under the condition where they are not in conflict with one another.

Based on the above, the optical imaging lens 10 in the embodiment of the invention can achieve the following effects and advantages.

1. The image-side surface 32 of the first lens element 3 has the convex surface 321 in the optical axis region I, which facilitates rays to focus. Collaboratively, the second lens element 4 has negative refractive power and the object-side surface 41 thereof has the convex portion 411 in the optical axis region I such that it is easy to correct the main aberration generated by the first lens element 3.

2. The third lens element 5 has positive refractive power and the image-side surface 52 thereof has the concave portion 521 in the optical axis region I, and the object-side surface 61 of the fourth lens element 6 has the concave portion 611 in the optical axis region I, both of which can facilitate to correct the main aberration generated by the two former lens elements.

3. The object-side surface 71 of the fifth lens element 7 has the convex portion 711 in the optical axis region I, which can facilitate to regulate the corrected aberration of the four former lens elements.

4. Regarding the position of the aperture stop 2, many parameters such as surface shape of lens element, thickness of lens element, air gaps between lens elements need to be taken into consideration, and optical characteristics and length of lens of the optical imaging lens also need to be taken into account while considering the characteristics of the lens elements described above. For example, the feature that the image-side surface 32 of the first lens element 3 has the convex portion 321 in the optical axis region I can effectively increase condensing capability. Collaboratively, the aperture stop 2 is disposed on the object-side surface 31 of the first lens element 3 so as to increase the aperture availability, i.e. reducing f-number (F/#). Accordingly, the design of the position of the aperture stop 2 has a special meaning.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element and a fifth lens element arranged in sequence from an object side to an image side along an optical axis, and each of the first lens element through the fifth lens element comprising an object-side surface facing the object side and allowing imaging rays to pass through and an image-side surface facing the image side and allowing the imaging rays to pass through;

the image-side surface of the first lens element comprising a convex portion in an optical axis region; and at least one of the object-side surface and the image-side surface of the first lens element being an aspheric surface;

the second lens element comprising negative refractive power, the object-side surface of the second lens element comprising a convex portion in an optical axis region and a concave portion in a periphery region, and at least one of the object-side surface and the image-side surface of the second lens element being an aspheric surface;

the third lens element comprising positive refractive power, the image-side surface of the third lens element comprising a concave portion in an optical axis region, and at least one of the object-side surface and the image-side surface of the third lens element being an aspheric surface;

the object-side surface of the fourth lens element comprising a concave portion in an optical axis region, at least one of the object-side surface and the image-side surface of the fourth lens element being an aspheric surface; and the object-side surface of the fifth lens element comprising a convex portion in an optical axis region, the object-side surface and the image-side surface of the fifth lens element being an aspheric surface;

wherein the number of lens elements of the optical imaging lens having refractive power are only five, and the optical imaging lens satisfies:

$$\sqrt{\frac{TTL}{EFL}} \times F/\# \leq 2.3$$

wherein TTL is a distance from the object-side surface of the first lens element to an image plane of the optical imaging lens along the optical axis, EFL is an effective focal length of the optical imaging lens, F/# is an f-number of the optical imaging lens, and a ratio obtained by dividing a distance from the object-side surface of the third lens element to the object-side surface of the fifth lens element along the optical axis by a thickness of the fifth lens element along the optical axis is less than or equal to 2.25.

2. The optical imaging lens according to claim 1, wherein the optical imaging lens further satisfies EFL/(G12+G45)≤27.00, wherein G12 is an air gap between the first lens element and the second lens element along the optical axis, and G45 is an air gap between the fourth lens element and the fifth lens element along the optical axis.

3. The optical imaging lens according to claim 1, wherein the optical imaging lens further satisfies (T2+G23)/(G12+G45)≤2.90, wherein T2 is a thickness of the second lens element along the optical axis, G23 is an air gap between the second lens element and the third lens element along the optical axis, G12 is an air gap between the first lens element and the second lens element along the optical axis, and G45 is an air gap between the fourth lens element and the fifth lens element along the optical axis.

4. The optical imaging lens according to claim 1, wherein the optical imaging lens further satisfies (T2+T3+T4)/(G12+G45)≤7.50, wherein T2 is a thickness of the second lens element along the optical axis, T3 is a thickness of the third lens element along the optical axis, T4 is a thickness of the fourth lens element along the optical axis, G12 is an air gap between the first lens element and the second lens element along the optical axis, and G45 is an air gap between the fourth lens element and the fifth lens element along the optical axis.

5. The optical imaging lens according to claim 1, wherein the optical imaging lens further satisfies (T2+G23+T3)/(G12+G45)≤8.00, wherein T2 is a thickness of the second lens element along the optical axis, G23 is an air gap between the second lens element and the third lens element along the optical axis, T3 is a thickness of the third lens element along the optical axis, G12 is an air gap between the first lens element and the second lens element along the optical axis, and G45 is an air gap between the fourth lens element and the fifth lens element.

6. The optical imaging lens according to claim 1, wherein the optical imaging lens further satisfies (T2+AAG)/(G12+G45)≤8.00, wherein T2 is a thickness of the second lens element along the optical axis, AAG is a sum of four air gaps among the first lens element through the fifth lens element along the optical axis, G12 is an air gap between the first lens element and the second lens element along the optical axis, and G45 is an air gap between the fourth lens element and the fifth lens element along the optical axis.

7. The optical imaging lens according to claim 1, wherein the optical imaging lens further satisfies (T2+AAG)/T1≤1.60, wherein T2 is a thickness of the second lens element along the optical axis, AAG is a sum of four air gaps among the first lens element through the fifth lens element along the optical axis, and T1 is a thickness of the first lens element along the optical axis.

8. The optical imaging lens according to claim 1, wherein the optical imaging lens further satisfies (T2+G23+T3)/T1≤1.50, wherein T2 is a thickness of the second lens element along the optical axis, G23 is an air gap between the second lens element and the third lens element along the optical axis, T3 is a thickness of the third lens element along the optical axis, and T1 is a thickness of the first lens element along the optical axis.

9. The optical imaging lens according to claim 1, wherein the optical imaging lens further satisfies (T2+T3+T4)/T1≤1.70, wherein T2 is a thickness of the second lens element along the optical axis, T3 is a thickness of the third lens element along the optical axis, T4 is a thickness of the fourth lens element along the optical axis, and T1 is a thickness of the first lens element along the optical axis.

10. The optical imaging lens according to claim 1, wherein the optical imaging lens further satisfies ALT/(T1+G12)≤3.60, wherein ALT is a sum of thicknesses of the first lens element, the second lens element, the third lens element, the fourth lens element and the fifth lens element along the optical axis, T1 is the thickness of the first lens element along the optical axis, and G12 is an air gap between the first lens element and the second lens element along the optical axis.

11. The optical imaging lens according to claim 10, wherein the optical imaging lens further satisfies ALT/

T4≤5.10, wherein T4 is a thickness of the fourth lens element along the optical axis.

12. The optical imaging lens according to claim 10, wherein the optical imaging lens further satisfies AAG/T4≤1.70, wherein AAG is a sum of four air gaps among the first lens element through the fifth lens element along the optical axis, and T4 is a thickness of the fourth lens element along the optical axis.

13. The optical imaging lens according to claim 1, wherein the optical imaging lens further satisfies ALT/T1≤4.00, wherein ALT is a sum of thicknesses of the first lens element, the second lens element, the third lens element, the fourth lens element, and the fifth lens element along the optical axis, and T1 is the thickness of the first lens element along the optical axis.

14. The optical imaging lens according to claim 13, wherein the optical imaging lens further satisfies ALT/(T4+G45)≤4.80, wherein T4 is a thickness of the fourth lens element along the optical axis, and G45 is an air gap between the fourth lens element and the fifth lens element along the optical axis.

15. The optical imaging lens according to claim 13, wherein the optical imaging lens further satisfies AAG/(T4+G45)≤1.60, wherein AAG is a sum of four air gaps among the first lens element through the fifth lens element along the optical axis, and T4 is a thickness of the fourth lens element along the optical axis, and G45 is an air gap between the fourth lens element and the fifth lens element along the optical axis.

16. An optical imaging lens, comprising a first lens element, a second lens element, a third lens element, a fourth lens element and a fifth lens element arranged in sequence from an object side to an image side along an optical axis, and each of the first lens element through the fifth lens element comprising an object-side surface facing the object side and allowing imaging rays to pass through and an image-side surface facing the image side and allowing the imaging rays to pass through;
the image-side surface of the first lens element comprising a convex portion in an optical axis region; and at least one of the object-side surface and the image-side surface of the first lens element being an aspheric surface;
the second lens element comprising negative refractive power, the object-side surface of the second lens element comprising a convex portion in an optical axis region and a concave portion in a periphery region, and at least one of the object-side surface and the image-side surface of the second lens element being an aspheric surface;
the third lens element comprising positive refractive power, the image-side surface of the third lens element comprising a concave portion in an optical axis region, and at least one of the object-side surface and the image-side surface of the third lens element being an aspheric surface;
the object-side surface of the fourth lens element comprising a concave portion in an optical axis region, at least one of the object-side surface and the image-side surface of the fourth lens element being an aspheric surface; and
the object-side surface of the fifth lens element comprising a convex portion in an optical axis region, the object-side surface and the image-side surface of the fifth lens element being an aspheric surface;
wherein the number of lens elements of the optical imaging lens having refractive power is only five, and the optical imaging lens satisfies:

$$\sqrt{\frac{TTL}{EFL}} \times F/\# \leq 2.3$$

wherein TTL is a distance from the object-side surface of the first lens element to an image plane of the optical imaging lens along the optical axis, EFL is an effective focal length of the optical imaging lens, F/# is an f-number of the optical imaging lens, and a ratio obtained by dividing a distance from the object-side surface of the second lens element to the object-side surface of the fifth lens element along the optical axis by a thickness of the fifth lens element along the optical axis is less than or equal to 3.00.

17. The optical imaging lens according to claim 16, wherein the optical imaging lens further satisfies EFL/(G12+G45)≤27.00, wherein G12 is an air gap between the first lens element and the second lens element along the optical axis, and G45 is an air gap between the fourth lens element and the fifth lens element along the optical axis.

18. The optical imaging lens according to claim 16, wherein the optical imaging lens further satisfies (T2+G23)/(G12+G45)≤2.90, wherein T2 is a thickness of the second lens element along the optical axis, G23 is an air gap between the second lens element and the third lens element along the optical axis, G12 is an air gap between the first lens element and the second lens element along the optical axis, and G45 is an air gap between the fourth lens element and the fifth lens element along the optical axis.

19. The optical imaging lens according to claim 16, wherein the optical imaging lens further satisfies (T2+T3+T4)/(G12+G45)≤7.50, wherein T2 is a thickness of the second lens element along the optical axis, T3 is a thickness of the third lens element along the optical axis, T4 is a thickness of the fourth lens element along the optical axis, G12 is an air gap between the first lens element and the second lens element along the optical axis, and G45 is an air gap between the fourth lens element and the fifth lens element along the optical axis.

20. An optical imaging lens, comprising a first lens element, a second lens element, a third lens element, a fourth lens element and a fifth lens element arranged in sequence from an object side to an image side along an optical axis, and each of the first lens element through the fifth lens element comprising an object-side surface facing the object side and allowing imaging rays to pass through and an image-side surface facing the image side and allowing the imaging rays to pass through;
the image-side surface of the first lens element comprising a convex portion in an optical axis region; and at least one of the object-side surface and the image-side surface of the first lens element being an aspheric surface;
the second lens element comprising negative refractive power, the object-side surface of the second lens element comprising a convex portion in an optical axis region and a concave portion in a periphery region, and at least one of the object-side surface and the image-side surface of the second lens element being an aspheric surface;
the third lens element comprising positive refractive power, the image-side surface of the third lens element comprising a concave portion in an optical axis region, and at least one of the object-side surface and the image-side surface of the third lens element being an aspheric surface;

the object-side surface of the fourth lens element comprising a concave portion in an optical axis region, at least one of the object-side surface and the image-side surface of the fourth lens element being an aspheric surface; and the object-side surface of the fifth lens element comprising a convex portion in an optical axis region, the object-side surface and the image-side surface of the fifth lens element being an aspheric surface;

wherein the number of lens elements of the optical imaging lens having refractive power is only five, and the optical imaging lens satisfies:

$$\sqrt{\frac{TTL}{EFL}} \times F/\# \leq 2.3$$

wherein TTL is a distance from the object-side surface of the first lens element to an image plane of the optical imaging lens along the optical axis, EFL is an effective focal length of the optical imaging lens, F/# is an f-number of the optical imaging lens, and a ratio obtained by dividing a distance from the object-side surface of the second lens element to the object-side surface of the fourth lens element along the optical axis by a thickness of the fifth lens element along the optical axis is less than or equal to 1.90.

* * * * *